United States Patent [19]
Frankel et al.

[11] Patent Number: 5,515,535
[45] Date of Patent: May 7, 1996

[54] SYSTEM AND METHOD FOR PARALLEL VARIABLE OPTIMIZATION

[75] Inventors: James L. Frankel, Lexington; Steven J. Sistare, Somerville, both of Mass.

[73] Assignee: Thinking Machines Corporation, Bedford, Mass.

[21] Appl. No.: 307,533

[22] Filed: Sep. 15, 1994

Related U.S. Application Data

[63] Continuation of Ser. No. 788,004, Nov. 5, 1991, abandoned.
[51] Int. Cl.$^6$ .................................................. G06F 9/45
[52] U.S. Cl. ..................... 395/700; 364/973; 364/280.5; 364/280.4
[58] Field of Search .................... 395/700; 364/280.5

[56] References Cited

U.S. PATENT DOCUMENTS

| | | | |
|---|---|---|---|
| 4,589,400 | 7/1986 | Hillis . | |
| 4,773,038 | 9/1988 | Hillis et al. . | |
| 4,827,403 | 5/1989 | Steele, Jr. et al. . | |
| 4,843,545 | 6/1989 | Kikuchi | 395/700 |
| 4,984,235 | 1/1991 | Hillis et al. . | |
| 5,142,681 | 8/1992 | Driscoll et al. | 395/700 |
| 5,230,050 | 7/1993 | Iitsuka et al. | 395/700 |
| 5,276,881 | 1/1994 | Chan et al. | 395/700 |

OTHER PUBLICATIONS

Alfred Aho et al., "Compilers, Principles, Techniques and Tools", pp. 534, 535, 598–600, 631 and 632, (1988).
C* Programming Guide, Thinking Machines Corporation, Version 6.0, pp. 108, 113–120, 134, and 143–171, Nov. 1990.
Paris Reference Manual, Thinking Machines Corporation, Version 6.0, pp. 38–41, 167, 223–227, 385–386, and 533, Feb. 1991.
Revised Paris Release Notes, Thinking Machines Corporation, Version 6.0, Feb. 1991.
Ryder et al, Experiments in Optimizing FP, IEEE Transactions on Software Engineering, vol. 14 No. 4 Apr. 1988, pp. 444–453.

*Primary Examiner*—Kevin A. Kriess
*Assistant Examiner*—Lucien Toplu
*Attorney, Agent, or Firm*—Richard A. Jordan

[57] ABSTRACT

An optimizer for optimizing an intermediate representation (IR) tree having multiple nodes. The IR tree represents a partial compilation of a source code. The source code is written using a high level language supporting data parallel processing. According to the present invention, the optimizer optimizes the IR tree by minimizing the number and size of temporary parallel variables in the IR tree. Such minimization optimizes the IR tree because temporary parallel variables require an enormous amount of space in memory.

6 Claims, 13 Drawing Sheets

SYSTEM AND METHOD FOR PARALLEL VARIABLE OPTIMIZATION

This is a continuation of application Ser. No. 07/788,004, filed on Nov. 5, 1991, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following application is assigned to the assignee of the present application:

U.S. patent application Ser. No. 07/042,761, filed Apr. 27, 1987, by W. Daniel Hillis, entitled "Method and Apparatus for Simulating M-Dimensional Connection Networks in an N-Dimensional Network Where M is Less Than N", incorporated herein by reference.

The following applications of common assignee contain some common disclosure, and are believed to have an effective filing date identical with that of the present application.

A COMPILER FOR PARALLEL COMMUNICATION INSTRUCTIONS, Attorney Docket No. 1366.0020000, incorporated herein by reference.

SYSTEM AND METHOD FOR SHAPE SELECTION AND CONTEXTUALIZATION, Attorney Docket No. 1366.0050000, incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to a system and method for compiling a computer program, and more particularly to a system and method for compiling a computer program wherein the computer program is adapted for use with a data parallel computer.

2. Related Art

A compiler is a computer program which receives a source program as input. The source program is written in a source language. The compiler translates the source program into an equivalent target program. The target program is written in a target language.

Many source and target languages are known. For example, source languages include Basic, Pascal, Fortran, C, and Lisp. Target languages include machine languages for computers having one or a great number of processors.

Compilers often include a module which optimizes the target program. This module is called, appropriately, an optimizer. Alternatively, the optimizer may be viewed as distinct from the compiler.

In compiling source programs, compilers often create and use temporary parallel variables. This is particularly true for compilers which support parallel data processing.

Temporary parallel variables require an enormous amount of memory space. Sometimes, the use of temporary parallel variables is necessary to properly compile the source program. Often, however, the use of temporary parallel variables is not necessary. In these later cases, the presence of temporary parallel variables in the target program is inefficient and wasteful.

Also, even when temporary parallel variables are necessary, the compiler may create and use temporary parallel variables which are larger than what is necessary. The use of larger than necessary temporary parallel variables is wasteful because, as noted above, the temporary parallel variables consume a great amount of memory space.

Therefore, a compiler (having an optimizer) which minimizes the number and size of temporary parallel variables is required.

SUMMARY OF THE INVENTION

The present invention is directed to an optimizer for optimizing an intermediate representation (IR) tree having multiple nodes. The IR tree represents a partial compilation of a source code. The source code is written using a high level language supporting data parallel processing.

According to the present invention, the optimizer optimizes the IR tree by minimizing the number and size of temporary parallel variables in the IR tree. Such minimization optimizes the IR tree because temporary parallel variables require an enormous amount of space in memory. The optimizer generally operates as follows.

First, the optimizer selects one of the nodes in the IR tree. Then, the optimizer determines whether the selected node is a shape assignment node. If the selected node is a shape assignment node, then the optimizer indicates in a list of shape equivalents that the source of the shape assignment node is equivalent to the destination of the shape assignment node. The optimizer performs the above steps on all of the nodes in the IR tree in order to complete the list of shape equivalents.

After the list of shape equivalents is complete, the optimizer returns to the top of the IR tree and selects one of the nodes. The optimizer determines whether the selected node is (1) a node having a parallel operation involving a promotion of a scalar value to a parallel variable; or (2) a node having a parallel operation involving a demotion of a parallel variable.

If the selected node is a node having a parallel operation involving a promotion of a scalar value to a parallel variable, then the optimizer attempts to eliminate the promotion.

If the selected node is a node having a parallel operation involving a demotion of a parallel variable, then the optimizer attempts to reduce the size of the parallel variable.

After performing the above steps, the optimizer attempts to identify and eliminate all unnecessary temporary variables in the IR tree. The optimizer performs the above steps for each of the nodes in the IR tree.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTIONS OF THE DRAWINGS

The present invention will be described with reference to the accompanying drawings, wherein.

Figure 1A:
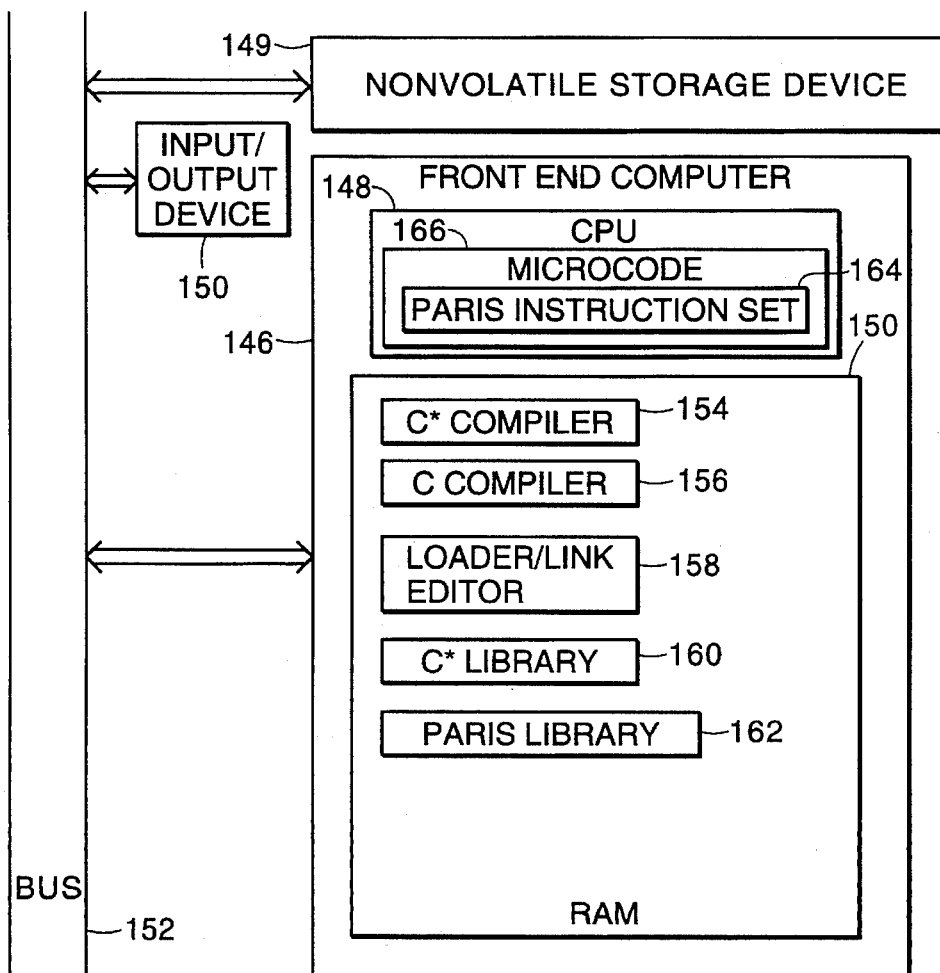
FIG. 1A shows a block diagram of a preferred environment in which the present invention could operate.
Figure 1A:
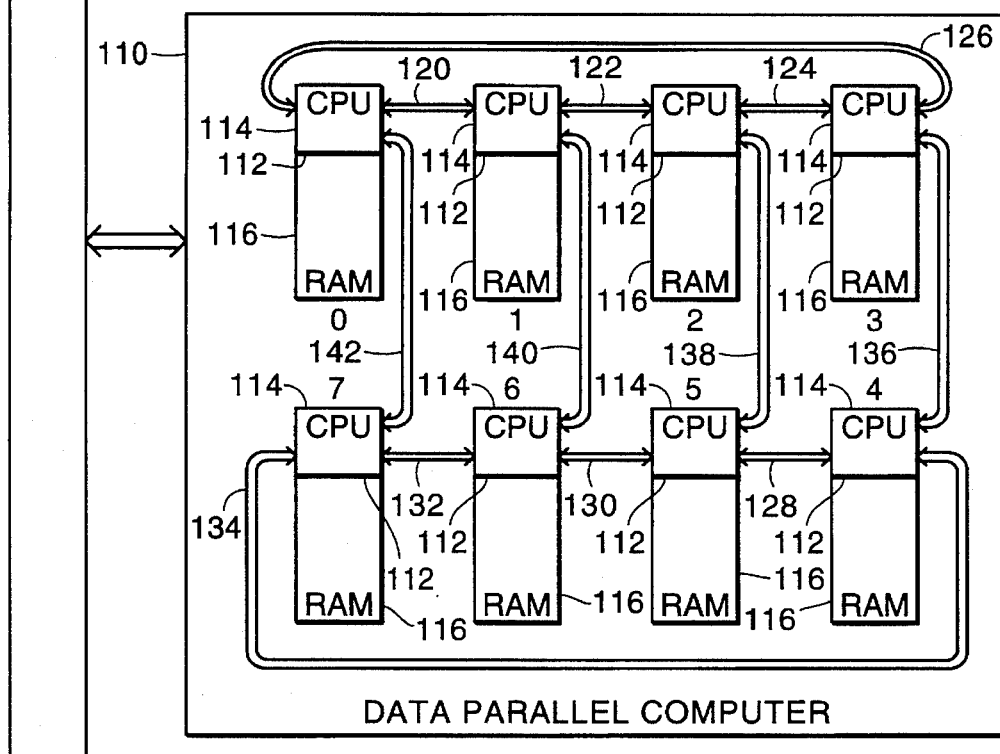
Figure 2:
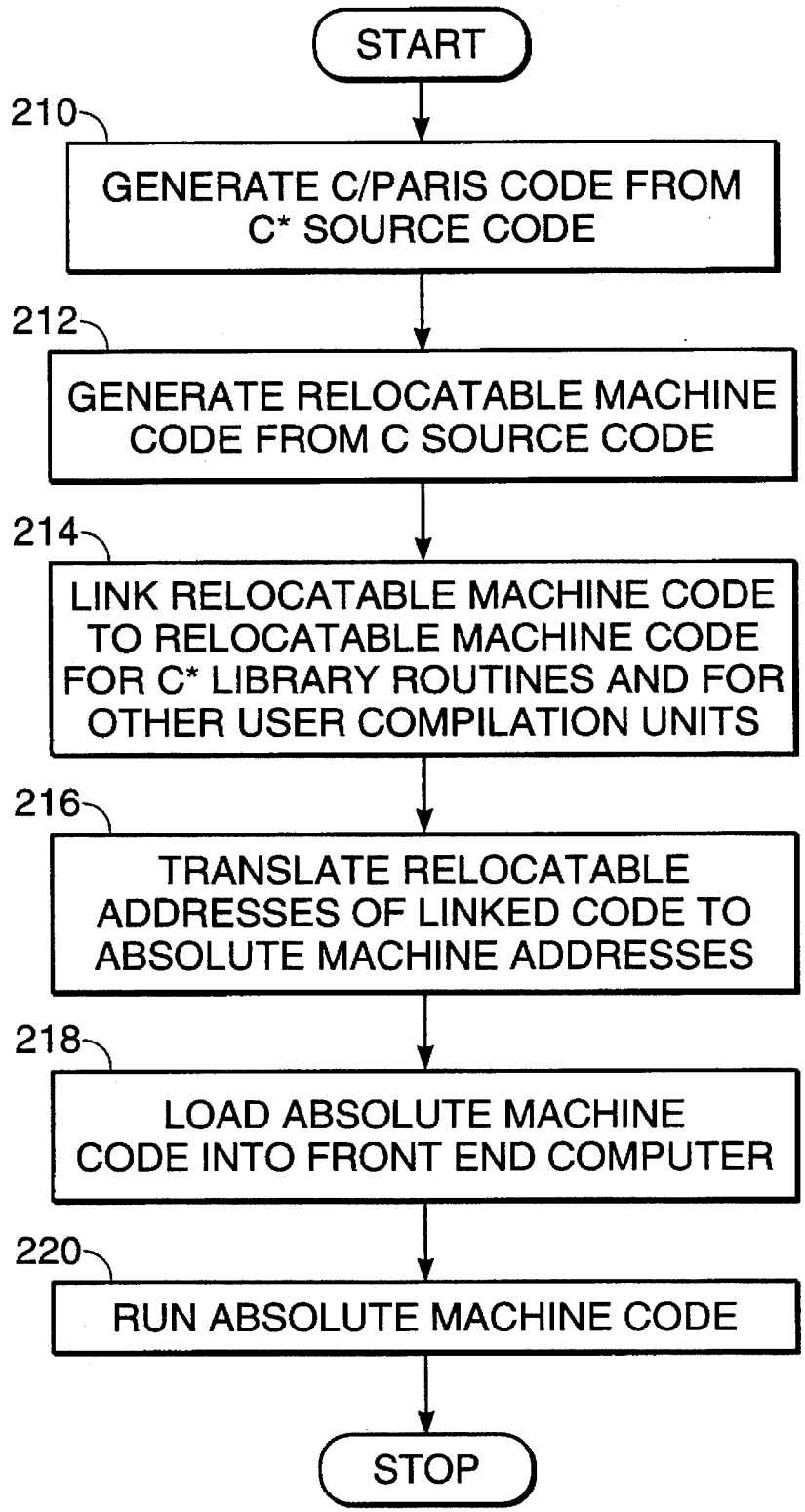

FIG. 2 is a flow chart which illustrates the relationship between software modules 154, 156, 158, 160 and 162 and firmware module 164 of FIG. 1A.

Figure 3A:
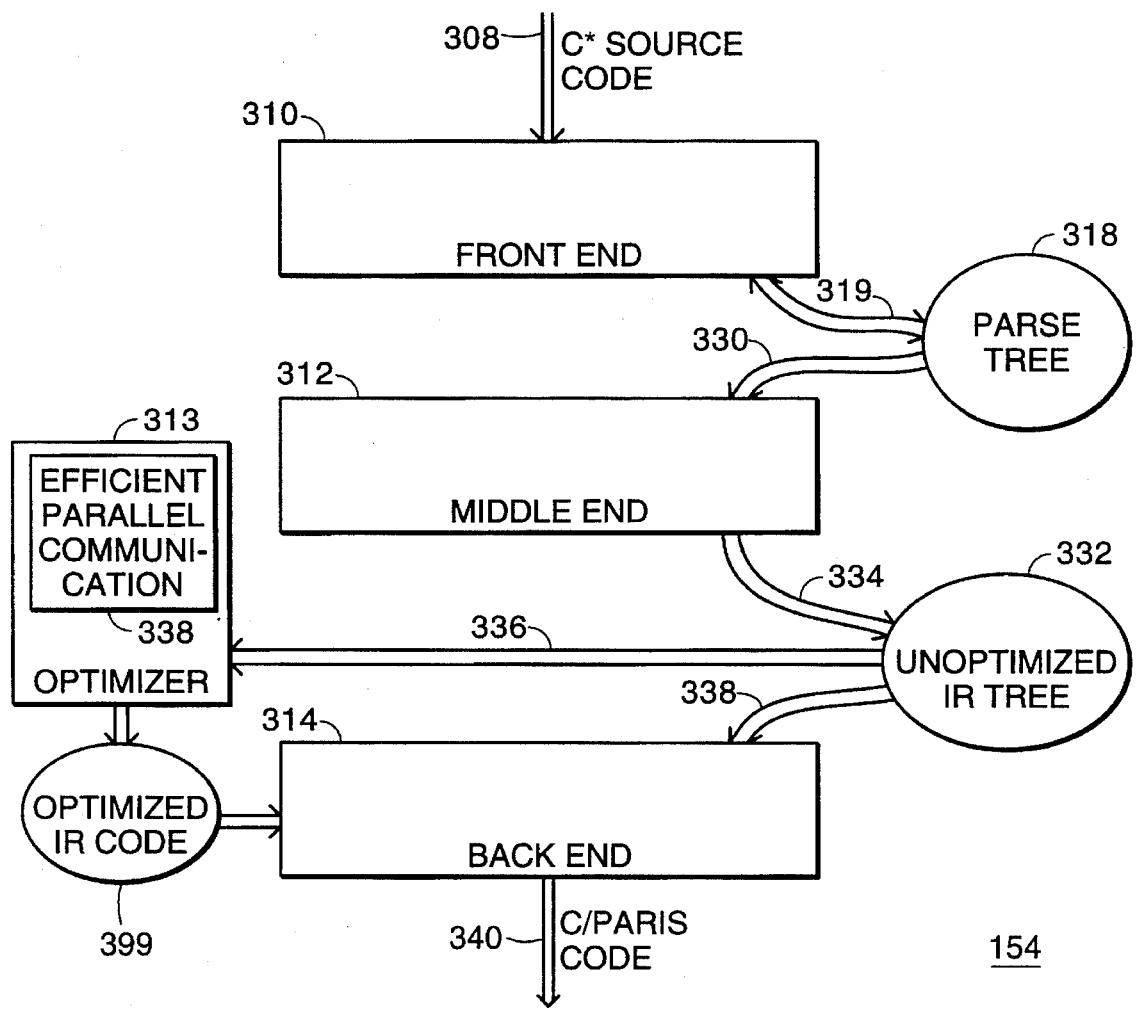

FIG. 3A is a high level block diagram of the structure of a C* compiler of the present invention.

Figure 3B:
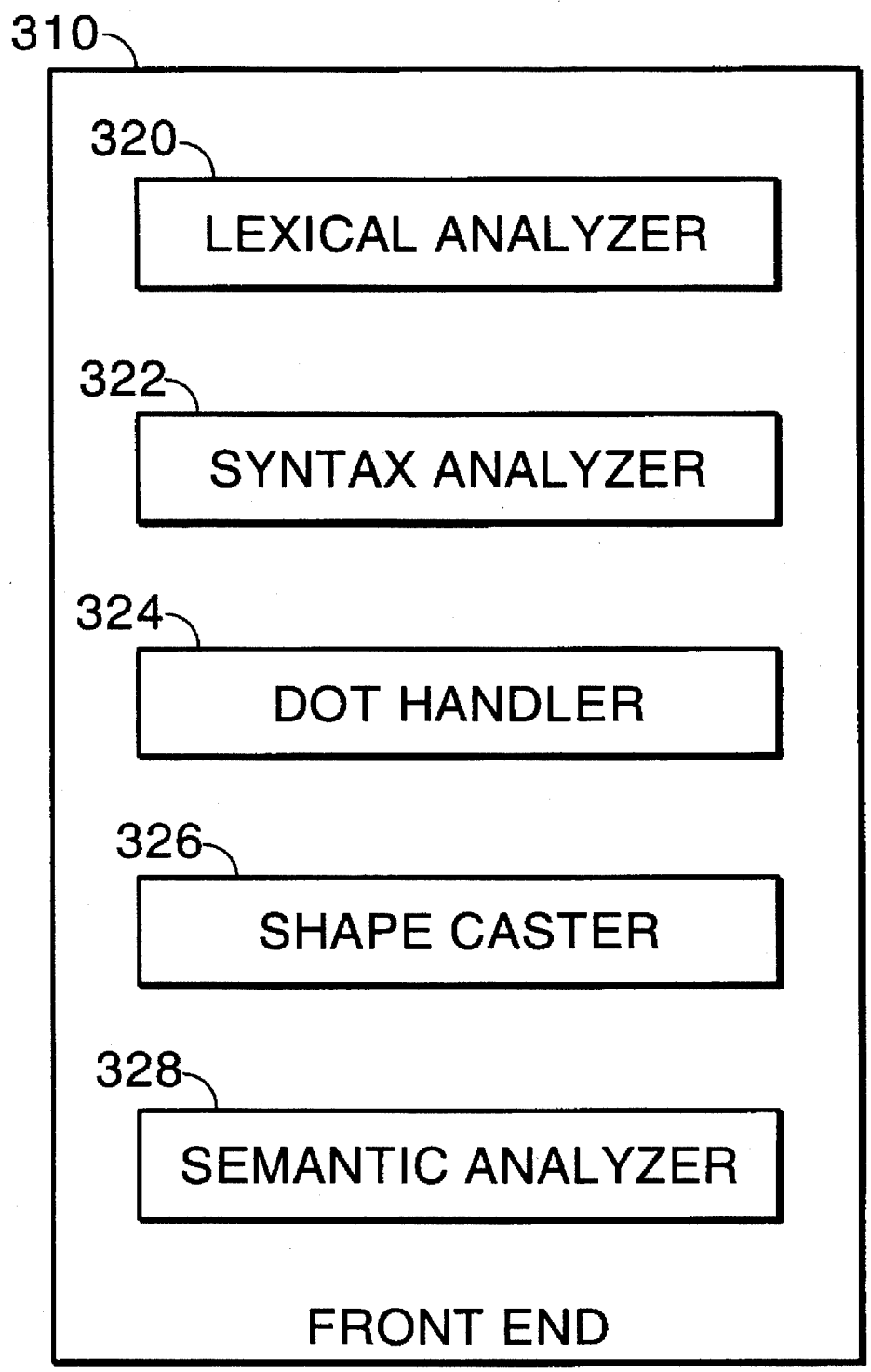

FIG. 3B illustrates the structure of a front end of the compiler of the present invention.

Figure 4:
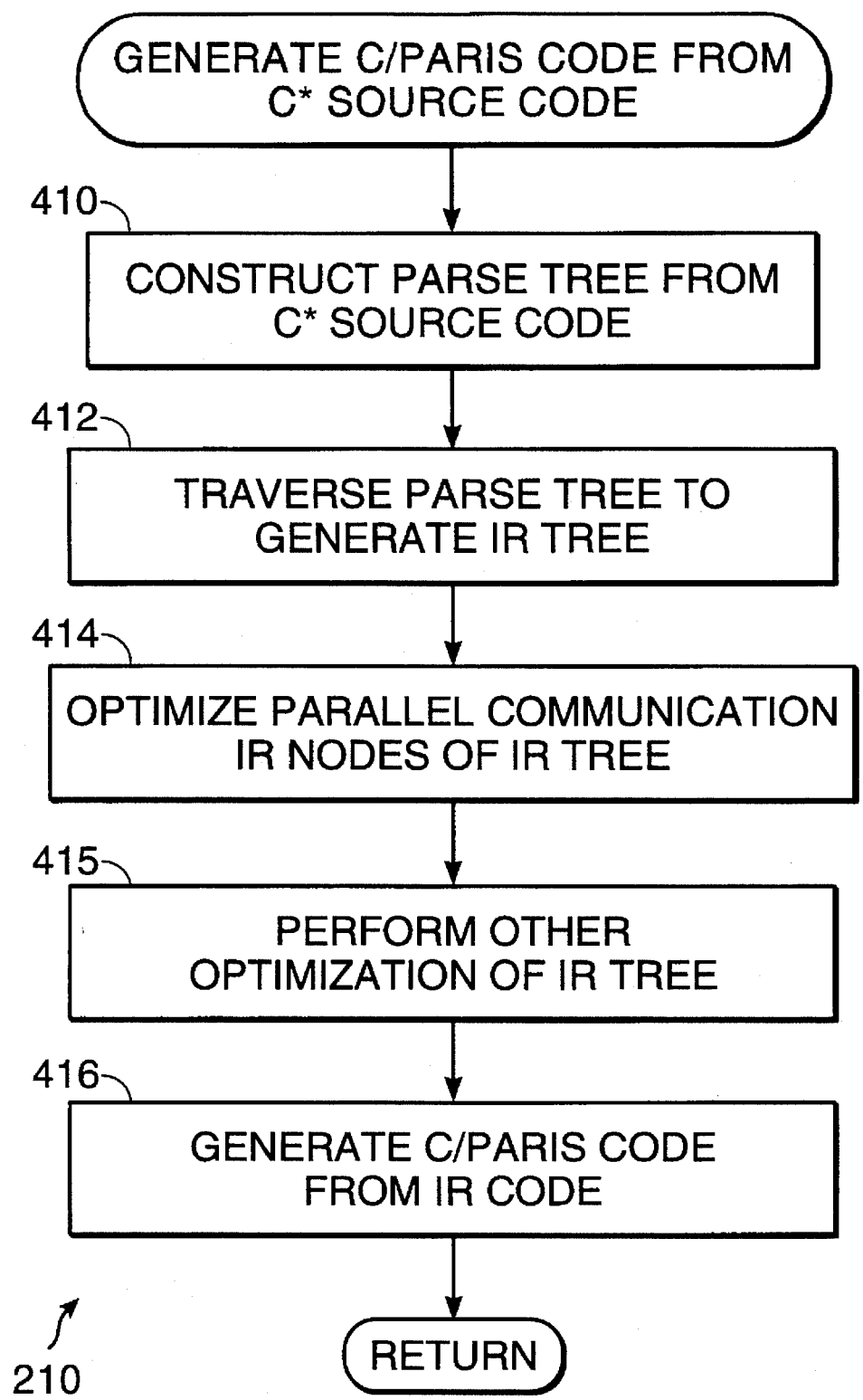

FIG. 4 is a flow chart which illustrates the interaction between modules of FIG. 3A.

Figure 5:
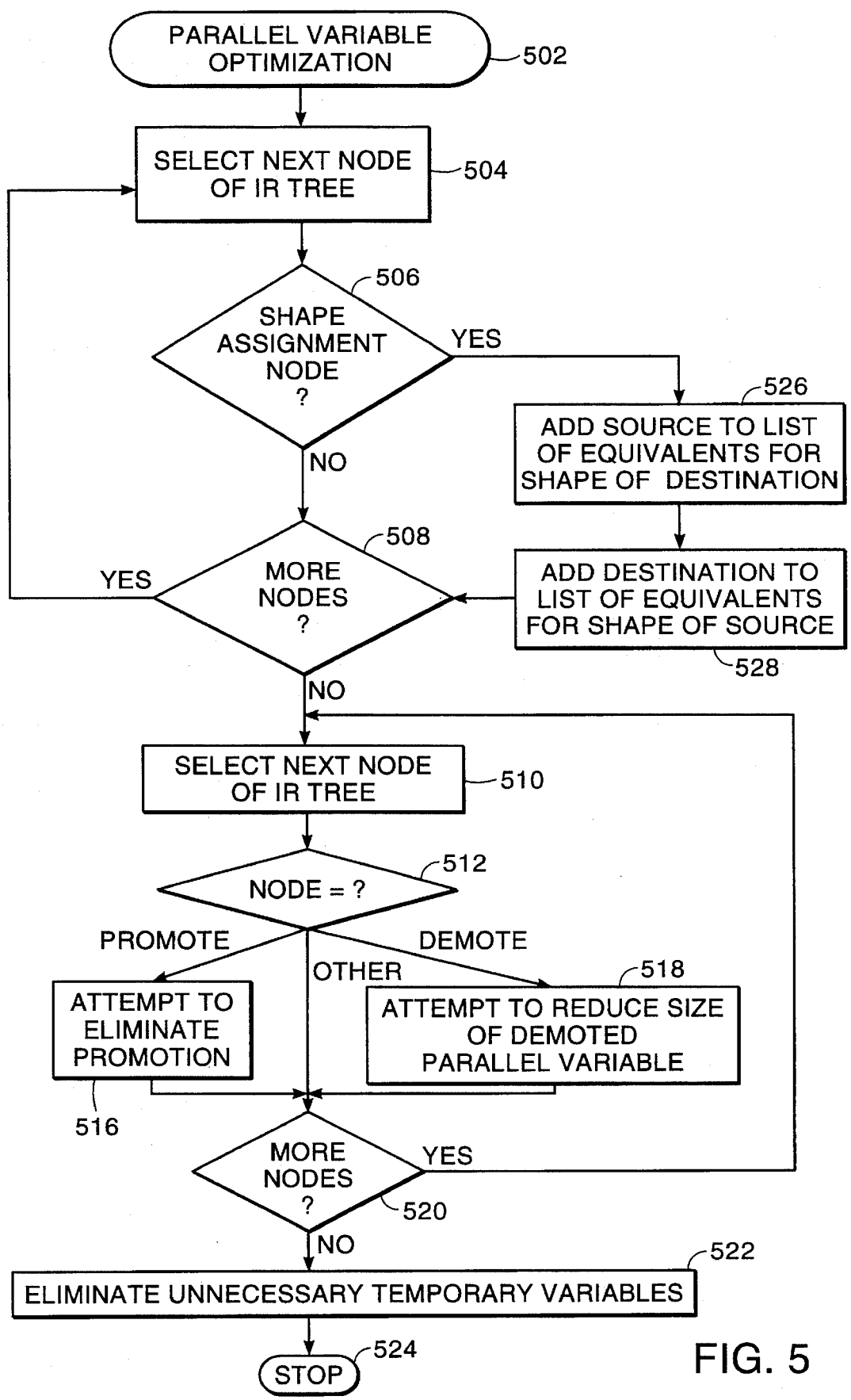

FIG. 5 illustrates the operation of an IR code optimizer with regard to parallel-variable optimization.

Figure 6:
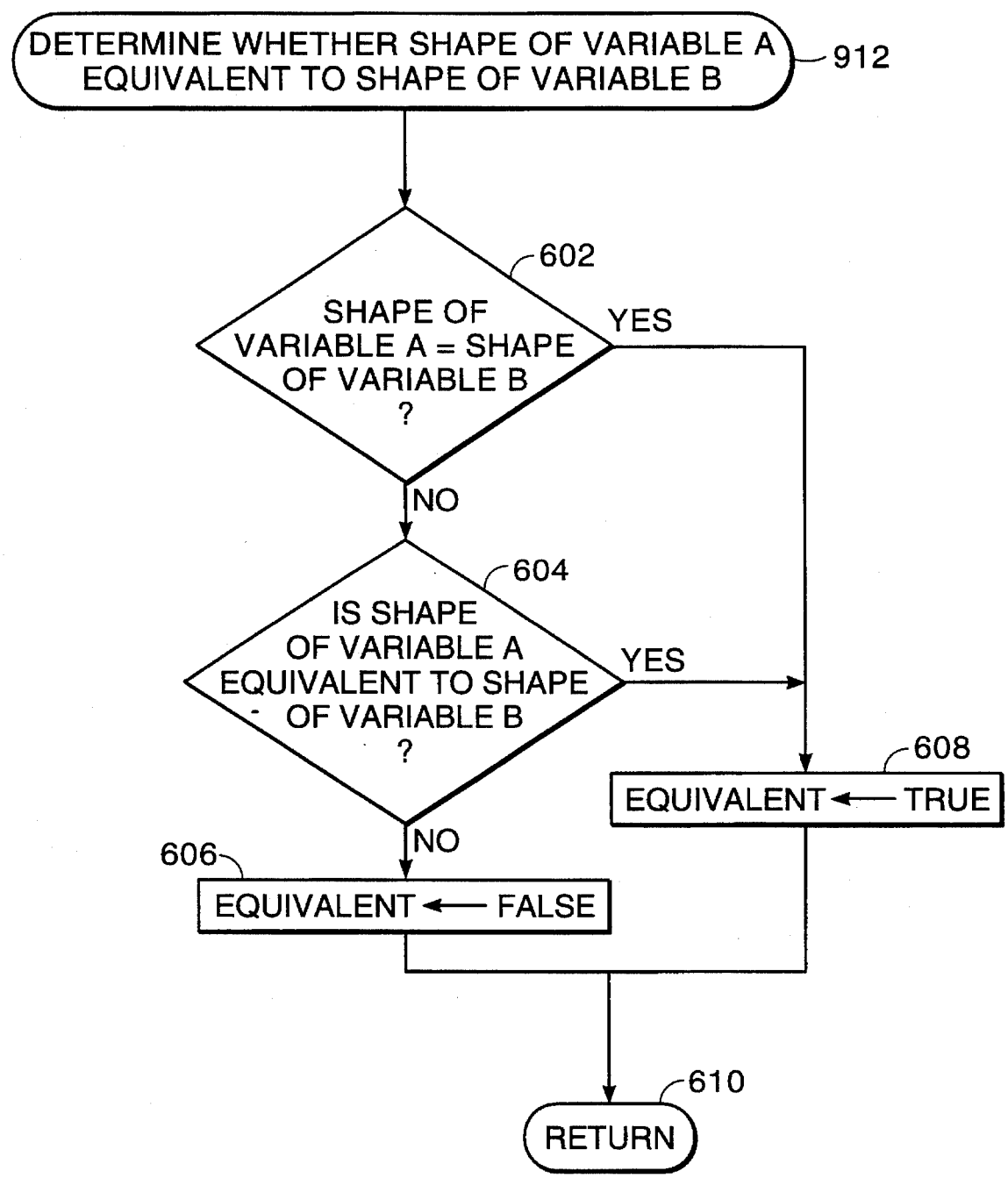

FIG. 6 illustrates the manner in which the IR code optimizer determines shape equivalence/nonequivalence of two parallel variables.

Figure 7:
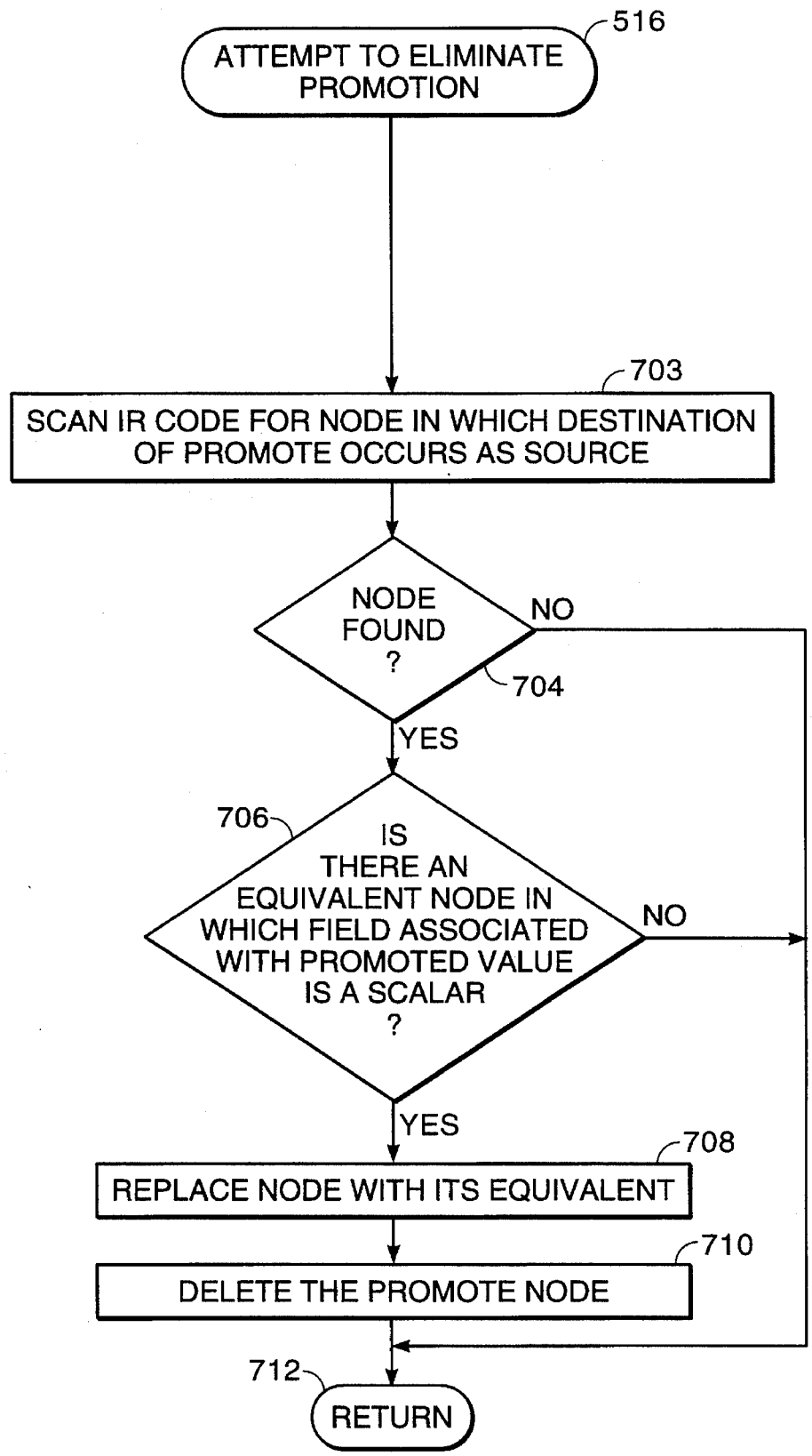

FIG. 7 illustrates the operation of the IR code optimizer during a step 516 in greater detail.

Figure 8A:
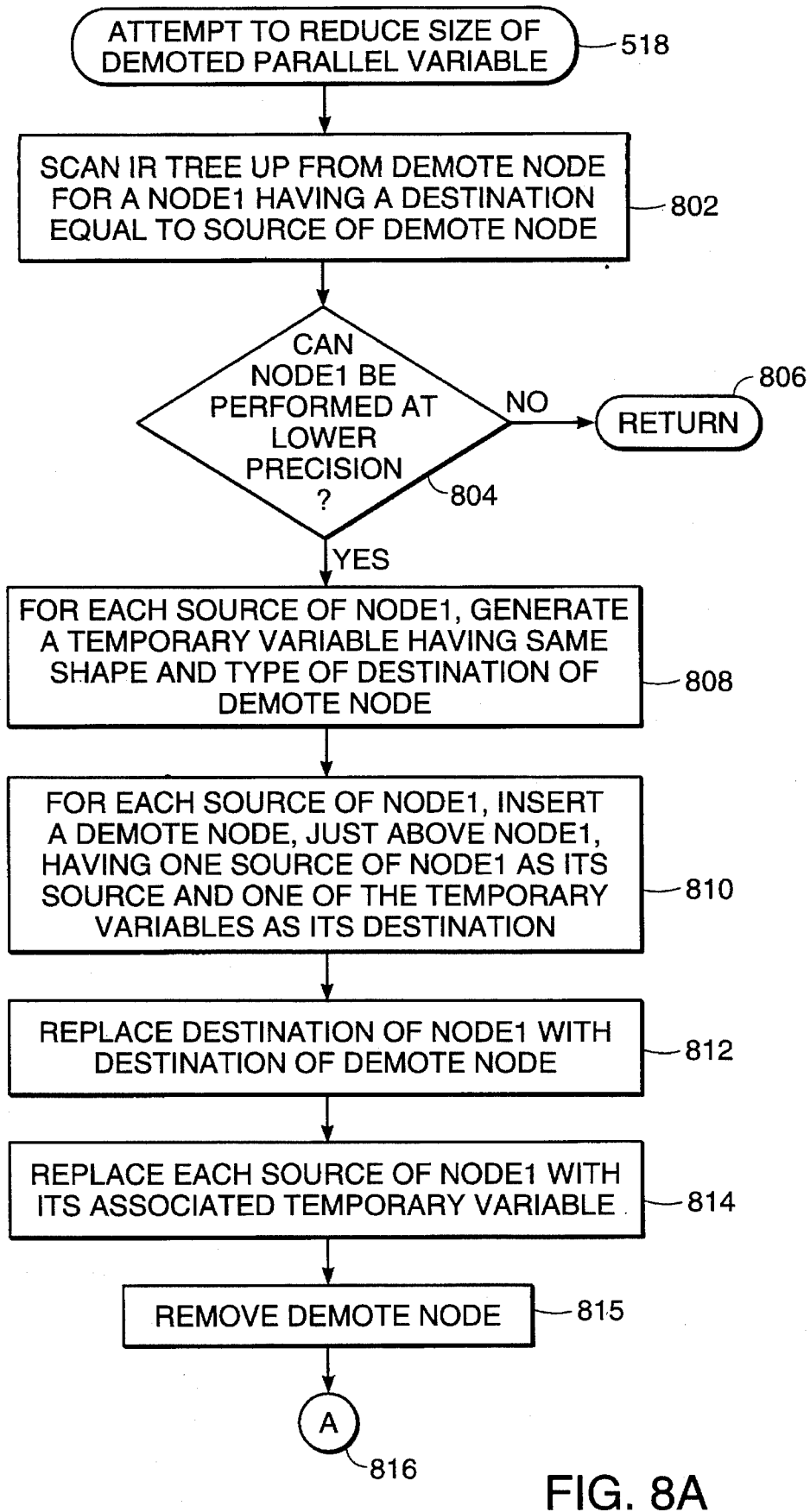
Figure 8B:
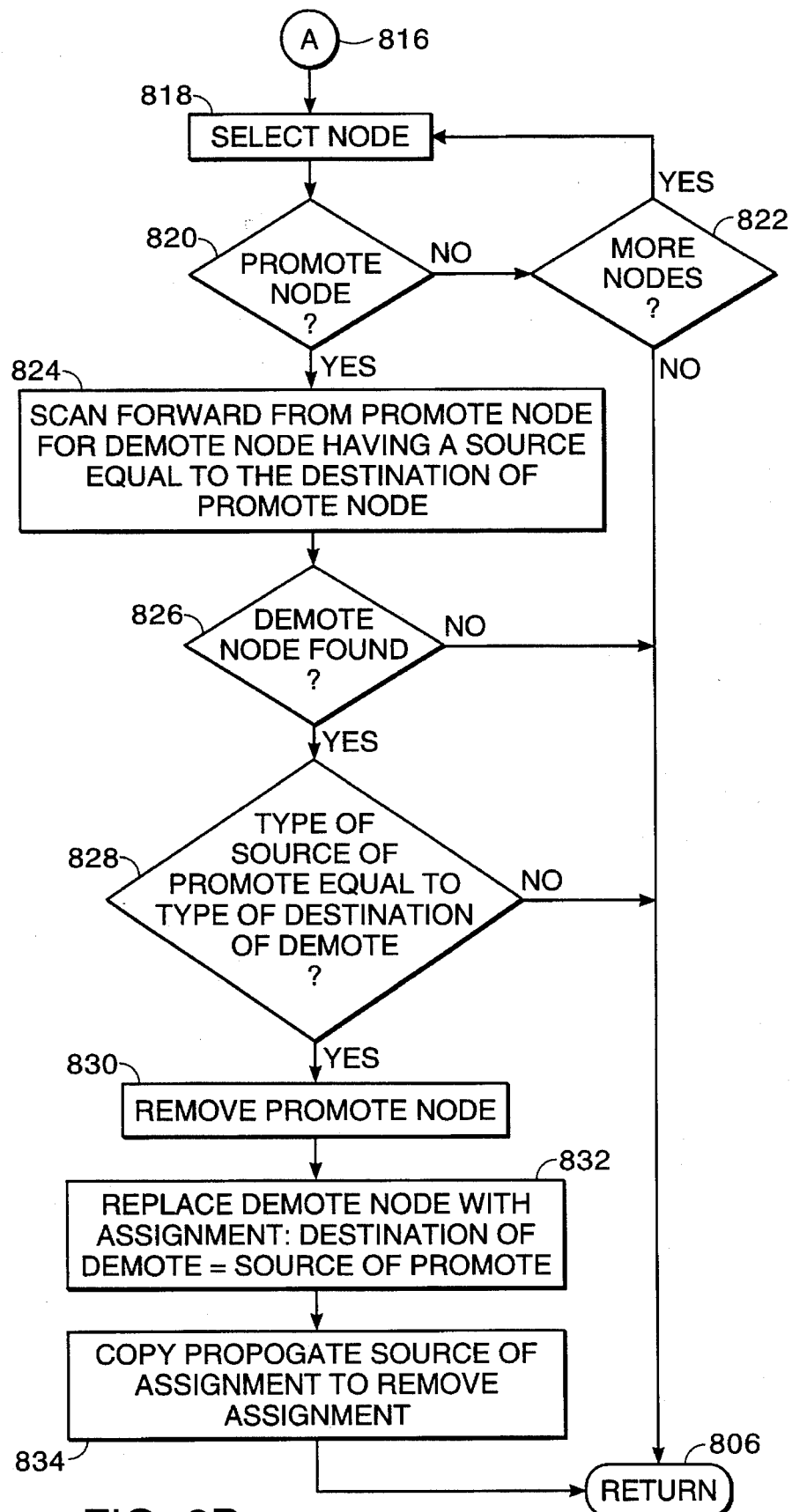

FIGS. 8A and 8B collectively illustrate the operation of the IR code optimizer during, a step 518.

Figure 9A:
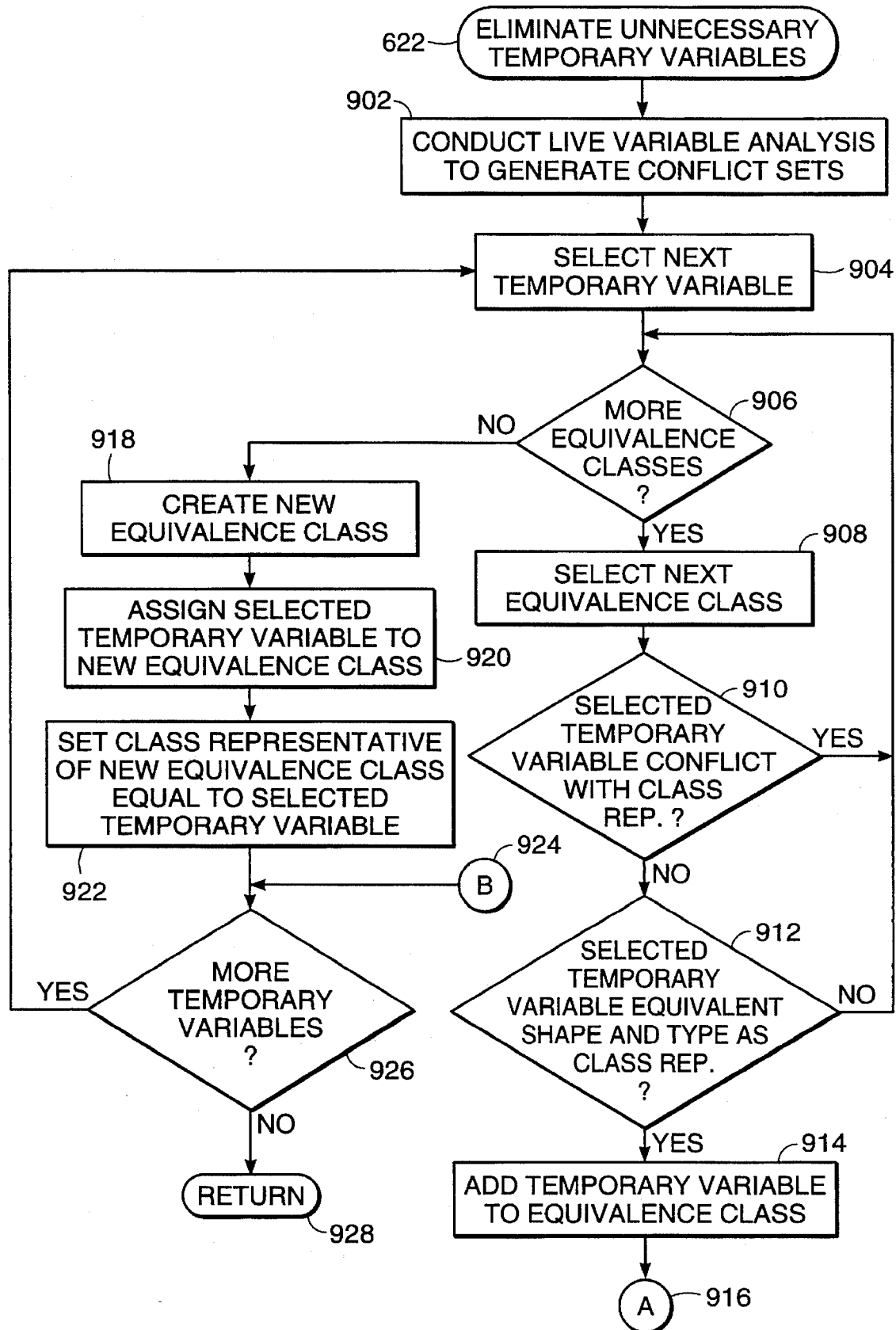
Figure 9B:
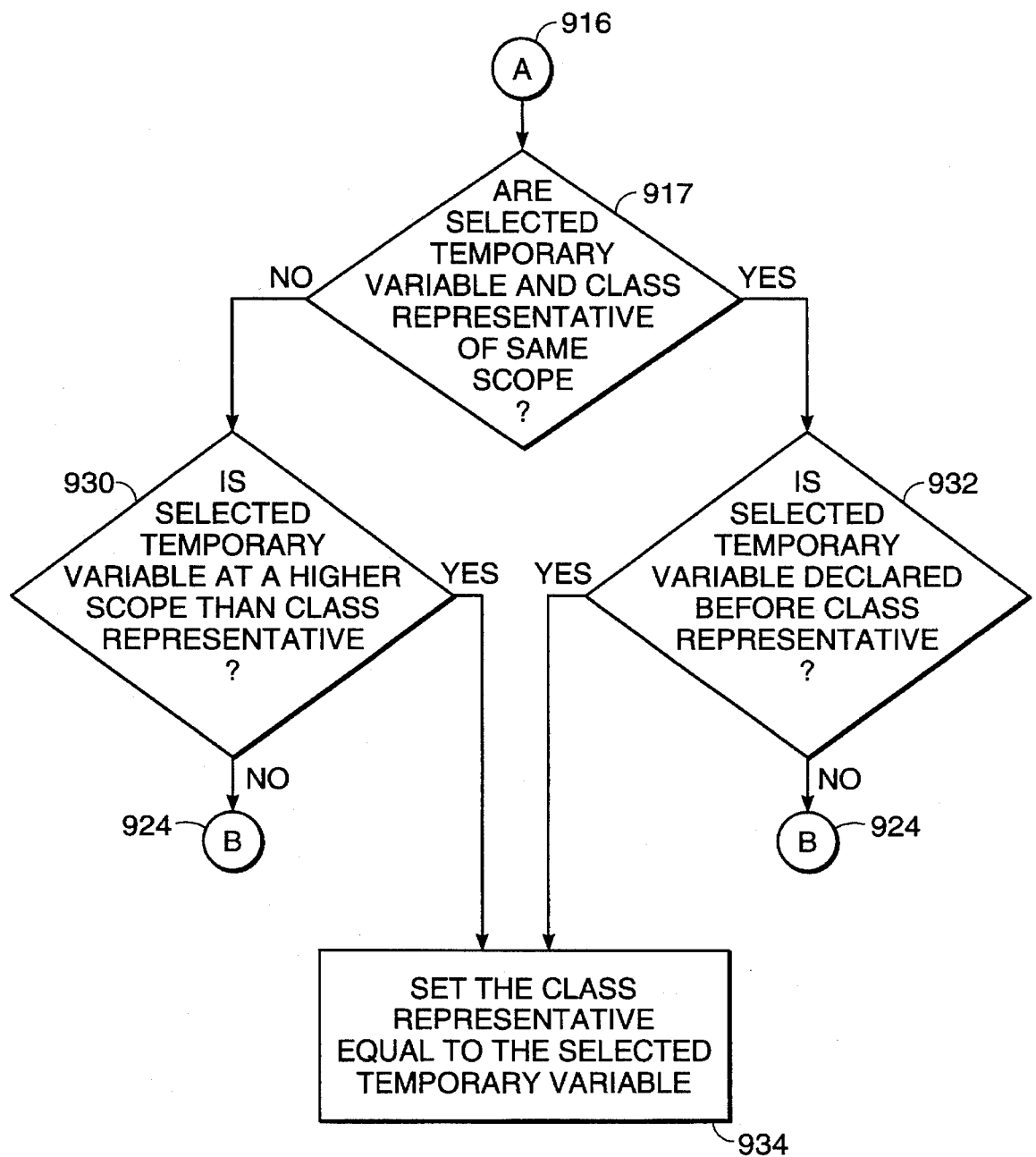

FIGS. 9A and 9B collectively illustrate the operation of the IR code optimizer during a step 522.

DETAILED DESCRIPTION OF THE PREFERRED EMBODIMENTS

1. Hardware and Software Environment of the Present Invention

The present invention is directed to a software compiler for compiling a computer program wherein the computer program is adapted for use with a data parallel computer. In this patent document, the terms "computer program" and "source code" are used interchangeably.

In a preferred environment of the present invention, the data parallel computer is one manufactured by Thinking Machines Corporation, such as the Connection Machine® Model CM1™, CM2 ™ and CM5 ™ Supercomputers. These and other preferred environments of the present invention are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including one embodiment of processors and router, with which the present invention can be used. U.S. Pat. No. 4,984,235 describes a massively-parallel computer, including a second embodiment of processors. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating the 2-, 3-, or higher dimensional nearest-neighbor communication network ("NEWS") between chips using the hypercube wires.

The computer program is written in a high level language (HLL). A preferred HLL is C* (pronounced "see star"). C* is based on ANSI C and is extended to support parallel instructions and parallel data types. The C* language is described in detail in the Thinking Machines Corporation publication *C\* Programming Guide* (Version 6.0, November 1990) which is herein incorporated by reference in its entirety.

Figure 1B:
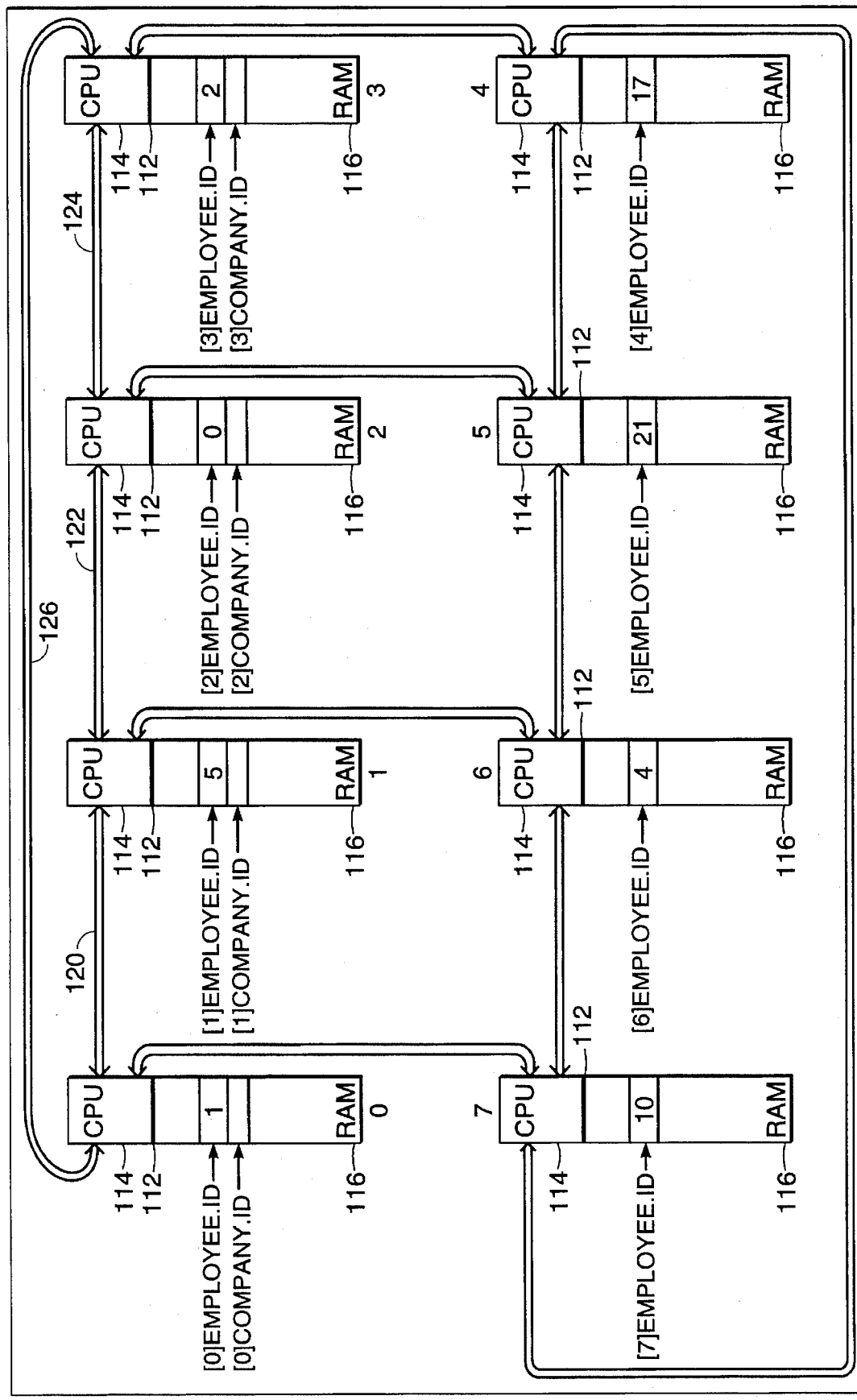
FIG. 1B illustrates a data parallel computer.

FIG. 1A shows a block diagram of the structure of a preferred environment in which the present invention could operate. A data parallel computer 110 is comprised of a plurality of parallel processors 112. The number of processors in an actual data parallel computer 110 might range from 2,048 to 65,536. For clarity, the data parallel computer 110 illustrated has only eight parallel processors 112 (parallel processor$_0$ to parallel processor$_7$). Each parallel processor 112 has a CPU 114 and a random access memory (RAM) 116. FIG. 1B illustrates the data parallel computer 110 in greater detail.

Each of the parallel processors 112 is directly connected to three other parallel processors 112 by paths. For example, the parallel processor$_0$ 112 is directly connected to the parallel processor$_1$ 112 via a path 120, the processor$_3$ 112 via a path 126, and the parallel processor$_7$ 112 via a path 142. The direct connections are such that no more than two paths need be used to send data between nearest-neighbor parallel processors 112.

The data parallel computer 110 is electrically connected to a host computer 146, to a non-volatile storage device 149, and to an input/output device 150 via a bus 152.

The host computer 146 is a serial computer such as a Sun 4 (manufactured by Sun Microsystems, Inc.) or a VAX (manufactured by Digital Equipment Corp.). The host computer 146 comprises a single host CPU (or a small number of CPUs) 148 and a RAM 150.

The environment of the present invention further includes various software modules and a firmware module. The software components include a C compiler 156, a loader/link editor 158, a C* library 160, and a Paris library 162. The software modules could reside in the RAM 150, in the non-volatile storage device 149, or in some combination of the two. In FIG. 1A, the software modules are shown in the RAM 150. The firmware module (a Paris instruction set 164) resides in a microcode 166 of the host CPU 148.

A C* compiler 154 of the present invention is also included in the RAM 150. An example of the C* compiler 154 is the Thinking Machines Corporation C* Compiler, Version 6.0.

As noted above, C* is an extension of ANSI C in that C* supports parallel instructions and parallel data types. Such extension of ANSI C is achieved via use of a native instruction set of the data parallel computer. One such native instruction set is a Paris language. The Paris language is a low-level instruction set for programming the data parallel computer. The Paris language is described in the Thinking Machines Corporation documents *Paris Reference Manual* (Version 6.0, February 1991) and Revised Paris Release Notes (Version 6.0, February 1991), which are herein incorporated by reference in their entireties. These documents are available from the Thinking Machines Corporation Customer Support Department at 245 First Street, Cambridge, Mass.

The Paris instruction set 164 and the Paris library 162 implement the Paris language. The Paris instruction set 164 and the Paris library 162 are part of the system software for the Connection Machine® Model CM2™ Supercomputer.

FIG. 2 is a flow chart which illustrates the relationship between the software modules 154, 156, 158, 160 and 162 and the firmware module 164 of FIG. 1A. Referring to FIG. 2, in a step 210 the C* compiler 154 generates C source code from C* source code. In a step 212, the C compiler 156 generates relocatable machine code from the C source code. In a step 214, the loader/link editor 158 links the relocatable machine code to user compilation units and to compilation units of the C* library 160 and the Paris library 162 to generate linked machine code. Steps 216, 218, and 220 involve executing the linked code. Specifically, in step 216, the relocatable addresses of the linked code are translated to absolute machine addresses. In step 218, the absolute machine code is loaded into the front end computer 146. In step 220, the absolute machine code is executed.

2. Selected Aspects of the C* Programming Language

C* uses shapes and parallel variables for supporting data parallel programming.

A shape is a template for parallel data. A shape is specified by how many dimensions it has and by the number of positions in each of its dimensions. The total number of positions in a shape is the product of the number of positions in each of its dimensions. For example, an 8×4 shape has 32 positions.

In C*, a keyword "shape" is used to declare shapes. This is shown in Example 1.

shape [13994]employees;     (Example 1)

The statement in Example 1 declares a shape called employees. The shape employees has one dimension (that is, a rank of 1) and 13994 positions.

A dimension is also referred to as an axis. A shape can have multiple axes—each of the axes are specified in a set of brackets to the left of the shape name. For example, the statement in Example 2 declares a two-dimensional shape.

shape [256][512]image;     (Example 2)

The statement in Example 2 declares a shape called image. The image shape has two dimensions (that is, a rank of 2), one of 256 positions and another of 512 positions. The leftmost axis is referred to as axis 0. The next axis to the right is referred to as axis 1. Note that shapes can have more than two axes. Generally, axes are numbered from left to right starting with 0.

Parallel variables are similar to standard C variables. However, parallel variables have a shape in addition to their data type and storage classes. The shape defines how many elements of a parallel variable exists, and how they are organized. Each element occupies one position within the shape and contains a single value. If a shape has 13994 positions, for example, a parallel variable of that shape has 13994 elements, one for each position.

Each element of a parallel variable can be thought of as a single scalar variable. A C* program can carry out operations on all elements (or any subset of the elements) of a parallel variable at the same time. Operations which operate on parallel variables are called parallel operations.

C* supports promotion of scalar values to parallel variables. According to C*, programmers can use standard C binary operations when one of the operands is parallel and the other is scalar (the parallel variable must be of the current shape). In such cases, the scalar value is first promoted to a parallel value of the shape of the parallel operand, and this parallel value is used in the operation.

For example, if p1 is a parallel variable of the current shape, the statement in Example 3 promotes and assigns the scalar value 12 to each active element of p1.

p1=12;     (Example 3)

If s1 is scalar, the statement in Example 4 promotes and assigns the value of s1 to each active element of p1.

p1=s1;     (Example 4)

Similarly, the statement in Example 5 promotes and adds the value of s1 to each active element of p1, and assigns the result to the corresponding element of p2. Both p1 and p2 must be of the current shape.

p2=p1+s1;     (Example 5)

In compiling the source code 308, the compiler 154 of the present invention creates and utilizes temporary parallel variables. Temporary parallel variables require an enormous amount of space in the RAM 150. Sometimes, the use of the temporary parallel variables is necessary to properly compile the source code 308. Often, however, the use of temporary parallel variables is not necessary. In these latter cases, the presence of temporary parallel variables in the unoptimized IR code 332 is inefficient and wasteful.

Also, even when temporary parallel variables are necessary, the temporary parallel variables which the compiler 154 uses are sometimes larger than what is necessary. The use of larger than necessary temporary parallel variables is wasteful because, as noted above, the temporary parallel variables consume a great amount of space in the RAM 150. Depending on the specific architecture, operations on smaller temporary parallel variables may also execute faster.

3. Overview of the C* Compiler

The general operation of the C* compiler is similar to the operation of conventional compilers. Such operation of conventional compilers are well known and are described in many publically available documents, such as *Compilers, Principles, Techniques, and Tools* by Aho, Sethi, and Ullman (Addison-Wesley Publishing Company, Reading Mass., 1988), which is herein incorporated by reference in its entirety.

As noted above, however, the C* source code 308 may include instructions involving parallel variables. The compilation of such parallel instructions are not well known. In compiling the C* source code 308, the C* compiler 154 replaces these parallel instructions with calls to functions in the Paris library 162.

FIG. 3A is a high level block diagram of the structure of the C* compiler 154 of the present invention. As FIG. 3A shows, the C* compiler 154 is comprised of a front end 310, a middle end 314, an optimizer 313, and a back end 314. FIG. 3B illustrates the structure of the front end 310. The front end 310 includes a lexical analyzer 320, a syntax analyzer 322, a dot handler 324, a type caster 326 and a semantic analyzer 328.

FIG. 4 is a flow chart which illustrates the interaction between the modules of FIG. 3A. The flow chart of FIG. 4 also illustrates the detailed method of the step 210 of FIG. 2 of generating C source code from C* source code.

In a step 410, the front end 310 receives C* source code 308 and constructs a parse tree 318. Parse tree construction is carried out by the lexical analyzer 320, syntax analyzer 322, dot handler 324, type caster 326 and semantic analyzer 328.

In a step 412, the middle end 312 receives the parse tree 318 and generates an intermediate representation (IR) code 332. The IR code 332 is also called the IR tree 332. The IR code 332 contains calls to functions in the Paris library 1962. Note that the IR code 332 generated by the middle end 312 is unoptimized.

In a step 414, the IR code optimizer 313 optimizes the unoptimized IR code 332 received from the middle end 312 to produce optimized IR code 399. One aspect of the optimization is carried out by an efficient parallel communication module 338 of the optimizer 3 13. Specifically, the efficient grid communication module 338 replaces IR nodes which specify general parallel communication with IR nodes which specify grid communication where doing so is possible and would result in a more efficient communication. The structure and operation of the efficient grid communication module 338 is described in a pending patent application entitled "A Compiler For Parallel Communication Instructions" (Attorney Docket No. 1366.0020000), which was cited above.

In a step 415, the optimizer 313 performs other optimization. Aspects of this optimization are described in a pending patent application entitled "SYSTEM AND METHOD FOR SHAPE SELECTION AND CONTEXTUALIZATION", Attorney Docket No. 1366.0050000, which was cited above. Further aspects of this optimization are described below.

The back end 314 receives either the unoptimized IR code 332 (from the middle end 312) or the optimized IR code 399 (from the optimizer 313). In a step 416, the back end 318 generates C source code. As noted above, the C source code contains calls to functions in the Paris library 162. Thus, the C source code is also called C/Paris source code.

4. Overview of the IR Code Optimizer

The IR code optimizer 313 of the present invention operates to optimize the unoptimized IR code 332 in order to generate the optimized IR code 399. Specifically, the IR code optimizer 313 analyzes the unoptimized IR code 332 and minimizes the number and size of the temporary parallel variables in the unoptimized IR code 332. This is called parallel variable optimization.

Thus, the IR code optimizer 313 compensates for the inefficiencies of the compiler 154 in generating the unoptimized IR code 332 with regard to (1) unnecessarily creating and using temporary parallel variables, and (2) creating and using temporary parallel variables of a certain size in instances when temporary parallel variables of smaller sizes could be used.

FIG. 5 illustrates the operation of the IR code optimizer 313 with regard to parallel variable optimization.

In step 504, the IR code optimizer 313 selects the next node of the IR tree (associated with the unoptimized IR code 332) to process.

In step 506, the IR code optimizer 313 determines whether the selected node is a shape assignment node. A shape assignment node is a node which sets a shape equal to another shape. For example, suppose a source code 308 has the statements shown in Code Segment 1.

| | |
|---|---|
| 1 | shape [2] [10] shape A; |
| 2 | shape [2] [10] shape B; |
| 3 | |
| 4 | unsigned int: shape A Pvariable A; |
| 5 | unsigned int: shape B Pvariable B; |

Copyright, Thinking Machines Corporation, 1991
Code Segment 1

In Code Segment 1, the line numbers to the left are not included in the C* instructions but are for reference purposes only. This is true for all Code Segments contained herein.

The shape declaration statements in lines 1 and 2 declare shapeA and shape B. Note that shapeA and shapeB have the same layout (that is, the same size, dimension, and order in which their elements are stored in memory).

The parallel variable statements on lines 4 and 5 declare parallel variables PvariableA and PvariableB. Note that PvariableA and PvariableB do not have equivalent shapes since shapeA and shapeB, while they have the same layout, are not equivalent shapes. For two shapes to be equivalent, the shapes must either be identical (in which case the shapes would be equal), or be the subject of a shape assignment statement.

A shape assignment statement is shown below in Code Segment 2.

| | |
|---|---|
| 1 | shape [ ] [ ] shape A; |
| 2 | shape [2] [10] shape B; |
| 3 | |
| 4 | shape A = shape B;     /* shape assignment statement */ |
| 5 | |
| 6 | { |
| 7 | unsigned int: shape A Pvariable A; |
| 8 | unsigned int: shape B Pvariable B; |
| 9 | } |

Copyright, Thinking Machines Corporation, 1991
Code Segment 2

The shape assignment statement in line 4 assigns shapeB to shapeA, making shapeA and shapeB denote the same size, dimension, and layout. The shape assignment statement can be used only when shapeA and shapeB are declared as shapes having compatible ranks and the destination shape (that is, shapeA) is not compile time fully specified. The shape assignment node makes shapeA equivalent to shapeB. Thus, due to the shape assignment instruction, PvariableA and PvariableB have equivalent shapes.

Returning to FIG. 5, if the IR code optimizer 313 determines, in step 506, that the node is a shape assignment node, then the IR code optimizer 313 performs step 526. In step 526, the IR code optimizer adds the source of the assignment statement (that is, the shape to the right of the equal sign in the shape assignment statement) to the list of equivalents for the destination of the shape assignment statement (that is, the shape to the left of the equal sign in the shape assignment statement).

In step 528, the IR code optimizer 313 adds the destination shape to the list of equivalents for the source shape.

An example of a list of equivalents is shown below in Table 1. As Table 1 illustrates, shapeA has as an equivalent shape, shapeB. Similarly, shapeB has as an equivalent shape, shapeA.

TABLE 1

List of Equivalents

| Shape | Equivalent Shapes |
| --- | --- |
| shape A | shape B |
| shape B | shape A |

In step 508, the IR code optimizer 313 determines whether any nodes remain in the IR tree to process. If nodes remain, the IR code optimizer 313 returns to step 504. Therefore, the IR code optimizer 313 performs steps 504 and 506 (and conditionally steps 526 and 528) for each of the nodes in the IR tree.

If the IR code optimizer 313 determines, in step 508, that all of the nodes in the IR tree have been processed, then the IR code optimizer 313 processes step 510. In step 510, the IR code optimizer 313 returns to the top of the IR tree and selects the first node.

In step 512, the IR code optimizer 313 determines whether the node is a (1) a parallel instruction containing a promotion of a scalar value to a parallel variable, (2) a parallel operation containing a type demotion of a parallel variable, or (3) any other type of instruction.

If the IR code optimizer 313 determines that the node is a parallel operation containing a promotion of a scalar value to a parallel variable, then the IR code optimizer 313 executes step 516. In step 516, the IR code optimizer 313 attempts to eliminate the promotion of the scalar value to the parallel variable. The IR code optimizer 313 attempts to eliminate this promotion in order to minimize the number of temporary parallel variables. Generally, the IR code optimizer 313 performs step 516 by replacing an instruction having a parallel variable operand with an equivalent instruction having a scalar value operand, instead of the parallel variable operand.

If the IR code optimizer 313 determines that the node contains a parallel operation which contains a type demotion of a parallel variable, then the IR code optimizer 3 13 executes step 518. In step 518, the IR code optimizer 313 attempts to reduce the size of the demoted parallel variable.

Steps 516 and 518 are described in greater detail below.

If, in step 512, the IR code optimizer 313 determines that the node is something other than a parallel operation containing a promotion or a parallel operation containing a type demotion, then the IR code optimizer 313 executes step 520. The IR code optimizer 313 also executes step 520 after executing steps 516 and 518.

In step 520, the IR code optimizer 313 determines whether there are any more nodes in the IR tree to process. If there are more nodes, then the IR code optimizer 313 returns to step 510. Therefore, the IR code optimizer 313 executes steps 510 and 512 (and conditionally, steps 516 and 518) for each of the nodes in the IR tree.

If, in step 520, the IR code optimizer 313 determines that all the nodes have been processed, then the IR code optimizer 313 executes step 522. In step 522, the IR code optimizer 313 eliminates all unnecessary temporary parallel variables. After executing step 522, the parallel variable optimization performed by the IR code optimizer 313 is complete. Step 522 is described in greater detail below.

5. Step 516: Attempt to Eliminate Promotion

As noted above, during step 516 the IR code optimizer 313 attempts to eliminate promotions of scalar values to parallel variables. Of course, promotions are sometimes necessary. Thus, the IR code optimizer 313 must distinguish between promotions which may be eliminated and promotions which may not be eliminated. The example C* instructions in Code Segments 3, 4, and 5 illustrate a promotion which may be eliminated.

Code Segment 3 contains an addition of a+3 at line 5 a is a parallel variable. 3 is a scalar. According to C*, the scalar 3 must be promoted to a parallel variable before it may be added to a.

Code Segment 5 illustrates the unoptimized IR code 332 generated by the compiler 154. Note that Code Segment 5 has not been optimized by the IR code optimizer 313.

In line 7 of the Code Segment 5, a temporary parallel variable CMC_p_temp_0 (hereinafter called temporary parallel variable 0) is created. In line 9, the scalar 3 is moved into temporary parallel variable 0, thereby promoting the scalar 3 to a parallel variable. In line 10, a is added to the temporary parallel variable 0. In line 11, the content of the temporary parallel variable 0 is moved into the parallel variable result. Therefore, the C* instruction:

result=a+3 from line 5 of Code Segment 3 is represented by 4 instructions (at lines 7, 9, 10, 11) in the unoptimized IR code 332 shown in Code Segment 5. Additionally, the temporary parallel variable 0 was required.

Code Segment 4 illustrates the optimized IR code 399 representation of the Code Segment 3. The optimized IR code 399 illustrated in Code Segment 4 is generated by the IR code optimizer 313.

In line 9 of the Code Segment 4, the parallel variable a is added to the scalar 3. The sum is assigned to the parallel variable result. The instruction in line 9 automatically promotes the scalar 3 to a parallel variable. As illustrated by Code Segment 4, the IR code optimizer 313 has optimized the unoptimized IR code optimizer 332 illustrated in Code Segment 5 in that the addition in line 5 of the Code Segment 3 is represented by a single instruction in the optimized IR code 399 (at line 9 of Code Segment 4). Also, the IR code optimizer 313 is able to compile the addition at line 5 of Code Segment 3 without using a temporary parallel variable. Therefore, the optimized IR code 399 (illustrated in Code Segment 4) generated by the IR code optimizer 313 executes faster and requires less RAM memory.

```
Code Segment 3

1   int: current sum_product (
2   int: current a)
3   {
4   int: current result;
5   result = (a+3);
6   return result;
7   }
```

Copyright, Thinking Machines Corporation, 1991

```
Code Segment 4

1   CMC_i sum_product (a)
2        CMC_i a;
3
4   {
5   CMC_Shape_t CMC_entry_shape = ((CMC_call_start_trap && CMC_start_trap()),
6   CM current_vp set);
7   CMC_Pvar_t CMC_retrun_val = CMC_global_ret_val;
8   CMC_i result = CM_allocate_stack_field_vp_set (32, CM_current_vp_set);
9   CM_s_add_constant_2_1L (result, a, 3, 32);
10  CM_s_move_1L(CMC_return_val, result, 32);
11  CM_deallocate_stack_through (result);
12  return(CMC_return_val);
13  }
```

Copyright, Thinking Machines Corporation, 1991

```
Code Segment 5

1   CMC_i sum_product (a)
2        CMC_i a;
3   {
4   CMC_Shape_t CMC_entry_shape = (CMC_call_start_trap && CMC_start_trap()),
5   CM_current_vp_set);
6   CMC_Pvar_t CMC_return_val = CMC_global_ret_val;
7   CMC_i CMC_p_temp 0 = CM_allocate_stack_filed_vp_set (32, CM_current_vp_set);
8   CMC_i result = CM_allocate_stack_filed_bp_set(32, CM_current_vp_set);
9   CM_s_move_const_always_1L(CMC_p_temp_0, 3, 32);
10  CM_s_add_2_1L(CMC_p_temp_0, a, 32);
11  CM_s_move_1L(result, CMC_p_temp_0, 32);
12  CM_s_move_1L(CMC_return_val, result, 32);
13  CM_deallocate_stack_through(CMC_p_temp_0);
14  return(CMC_return_val);
15  }
```

Copyright, Thinking Machines Corporation, 1991

FIG. 7 illustrates the operation of the IR code optimizer 313 during step 516 in greater detail. In describing the flow chart in FIG. 7, reference will be made to Code Segments 3, 4, and 5.

In step 703, the IR code optimizer 313 scans forward in the unoptimized IR code 332 for the node in which the destination of the promotion occurs as the source. For example, in Code Segment 5, the destination of the promotion in line 9 is the temporary parallel variable 0. Specifically, the temporary parallel variable 0 receives the promotion of the scalar value 3. Scanning forward from line 9, the IR code optimizer 313 would locate the instruction at line 10. The temporary parallel variable 0 is the source in the instruction at line 10 (note that in the instruction at line 10, the temporary parallel variable 0 is both a source and a destination). Therefore, the IR code optimizer 313 in step 703 would locate the instruction at line 10.

In step 704, the IR code optimizer 313 would determine whether a node was found in step 703. If a node was not found, the IR code optimizer 313 could not eliminate the promotion. Therefore, the IR code optimizer 313 would return.

If the IR code optimizer 313 determines that a node was found in step 703, then the IR code optimizer 313 would process step 706. In step 706, the IR code optimizer 313 would determine whether an equivalent instruction from the Paris library 162 exists wherein the field associated with the promoted value is a scalar. For example, in Code Segment 4, the instruction at line 9 performs the same function (that is, an addition) as the instruction at line 10 in Code Segment 5. However, the instruction at line 9 in Code Segment 4 contains a scalar parameter whereas the instruction at line 10 in Code Segment 5 contains a parallel variable.

If such an equivalent node is not found in step 706, then the promotion cannot be eliminated and the IR code optimizer 313 returns. However, if such a node is found in step 706, then the IR code optimizer 313 processes step 708.

In step 708, the IR code optimizer 313 replaces the node in the unoptimized IR code 332 with its equivalent found in step 706. Therefore, referring to Code Segment 5, the IR code optimizer 313 would replace the line 10 with the instruction shown in Code Segment 4 at line 9.

In step 710, the IR code optimizer 313 eliminates the promote node. For example, in Code Segment 5, the IR code optimizer 313 eliminates the instructions at lines 7, 9, and 11. Note that these instructions are not in the optimized IR code 399 shown in Code Segment 4.

6. Step 518: Attempt to Reduce Size of Elements of Demoted Parallel Variable As noted above, during step 518 the IR code optimizer 313 attempts to reduce the size of the demoted parallel variable. Such operation by the IR code optimizer 313 is called "demotion optimization."

Demotion optimization according to the present invention shall be described below with reference to Code Segments 6, 7, and 8.

```
1   short:current sum_product (
2       short:current a,
3       short:current b,
4       short:current c)
5   {
6       short:current result;
7       result = (a+b)*c;
8       return result;
9   }
```

Copyright, Thinking Machines Corporation, 1991
Code Segment 6

```
1   CMC_s sum_product(a,b,c)
2       CMC_s a;
3       CMC_s b;
4       CMC_s c;
5   {
6     CMC_Shape_t CMC_entry_shape = ((CMC_call_start_trap && CMC_start_trap()),
7     CM_current_vp_set);
8     CMC_Pvar_t CMC_retrun_val = CMC_global_ret_val;
9     CMC_s CMC_op_ptemp_0 = CM_allocate_stack_field_vp_set(16,
      CM_current_vp_set);
10    CMC_s result = CM_allocate_stack_field_vp_set(16, CM_current_vp_set);
11    CM_s_add_3_1L (CMC_op_ptemp_0, a, b, 16);
12    CM_s_multiply_3_1L(result, CMC_op_ptemp_0, c, 16);
13    CM_s_move_1L(CMC_retrun_val, result, 16);
14    CM_deallocate_stack_through(CMC_op_ptemp_0);
15    return(CMC_return_val);
16  }
```

Copyright, Thinking Machines Corporation, 1991
Code Segment 7

```
1   CMC_s sum_product(a,b,c)
2       CMC_s a;
3       CMC_s b;
4       CMC_s c;
5   {
6     CMC_Shape_t CMC_entry_shape = ((CMC_call_start_trap && CMC_start_trap()),
7     CM_current_vp_set);
8     CMC_Pvar_t CMC_retrun_val = CMC_global_ret_val;
9     CMC_i CMC_p_temp_0 = CM_allocate_stack_filed_vp_set(64,
      CM_current_vp_set);
10    CMC_i CMC_p_temp_1 = CM_add_offset_to_field_id(CMC_p_temp_0, 32);
11    CMC_s result = CM_allocate_stack_field_vp_set (16, CM_current_vp_set);
12    CM_s_move_2L(CMC_p_temp_0, a, 32, 16);
13    CM_s_move_2L(CMC_p_temp_1, b, 32, 16);
14    CM_s_add_2_1L (CMC_p_temp_0, CMC_p_temp_1, 32);
15    CM_s_move_2L(CMC_p_temp_1, c, 32, 16);
16    CM_s_multiply_2_1L(CMC_p_temp_0, CMC_p_temp_1, 32);
17    CM_s_move_2L(result, CMC_p_temp_0, 16, 32);
18    CM_s_move_1L(CMC_return_val, result, 16);
19    CM_deallocate_stack_through(CMC_p_temp_0);
20  return(CMC_retrun_val);
21  }
```

Copyright, Thinking Machines Corporation, 1991
Code Segment 8

Code Segment 6 illustrates a routine written in C*. Code Segment illustrates an unoptimized IR code corresponding to the routine in Code Segment 6. Code Segment 7 illustrates an optimized IR code corresponding to the unoptimized IR code of Code Segment 8. The IR code optimizer 313 performs demotion optimization in order to generate the optimized IR code of Code Segment 7 from the unoptimized IR code from Code Segment 8.

Referring first to Code Segment 8, the variable a is moved to CMC_p_temp_0 (hereinafter called "temporary parallel variable 0") in line 12. At line 13, the variable b is moved to CMC_p_temp_1 (hereinafter called "temporary parallel variable 1"). In line 14, temporary parallel variable 0 (that is, variable a) is added to temporary parallel variable 1 (that is, variable b). In line 15, the variable c is moved into temporary parallel variable 1. In line 16, temporary parallel variable 0 (that is, the addition of a and b) is multiplied with temporary parallel variable 1 (that is, variable c). In line 17, the product is moved into the variable result.

Note that temporary parallel variable 0 and temporary parallel variable 1 are integers having 32 bits. Variables a, b and c are short integers having 16 bits. Therefore, it is inefficient for the compiler to compile certain mathematical operations involving the short integer variables a, b, and c by using the integer temporary parallel variable 0 and temporary parallel variable 1.

Code Segment 7 illustrates the optimized IR code corresponding to the unoptimized IR code in Code Segment 8. Note that in Code Segment 7, the IR code optimizer 313 has optimized the mathematical operations relating to the short integer variables a, b, and c using the variables themselves plus a short integer temporary parallel variable called CMC_op_ptemp_0 (hereinafter called "ptemp_0").

FIGS. 8A and 8B collectively illustrate the operation of the IR code optimizer 313 during step 518. In the operation shown in FIG. 8A, the IR code optimizer 313 determines whether a node having an output precision may be implemented using another node having a lower output precision. If such implementation is possible, then the IR code optimizer 313 inserts code to lower the output precision. In the operation shown in FIG. 8B, the IR code optimizer 313 eliminates unnecessary demote and promote nodes which were necessary to perform the above precision reduction.

In describing the flow chart contained in FIGS. 8A and 8B, reference shall be made to Code Segments 7 and 8. Specifically, a running example shall be used wherein the IR code optimizer 313 is compiling the unoptimized IR code illustrated in Code Segment 8 to produce the optimized IR code shown in Code Segment 7.

In step 802, the IR code optimizer 3 13 scans the IR tree backwards from the demote node (found in step 512) for a node having a destination equal to the source of the demote node. This node shall be called node 1 for reference purposes. Referring to Code Segment 8, assume that the demote node is as shown at line 17. During step 802, the IR code optimizer 313 would scan backwards and find the node corresponding to line 16. The node represented by line 16 is node 1.

Referring to Code Segment 8, the destination of the demote node is the variable result. Result has a shape current and a type short integer. Node 1 has two sources: temporary parallel variable 0 and temporary parallel variable 1. Therefore, in step 808, the IR code optimizer 313 generates two new temporary parallel variables, each having the shape current and the type short integer. For reference purposes, these :new temporary parallel variables shall be called NT0 and NT1 (where NT stands for "new temporary parallel variable").

In step 810, for each source of node 1, the IR code optimizer 313 inserts a demote node Oust above node 1), having one source of node 1 as its source and one of the temporary parallel variables as its destination. Referring to Code Segment 8, in step 810, the IR code optimizer 313 would insert the two nodes shown in Code Segment 8.1. Code Segment 8.1 is an addition to Code Segment 8. As their line numbers indicate, the lines in Code Segment 8.1 occur after line 15 in Code Segment 8. The lines in Code Segment 8.1 represent type casts wherein temporary parallel variable 0 is east to a short integer of shape current and assigned to NT0. Similarly, temporary parallel variable 1 is cast as a short integer of shape current and assigned to NT1.

In step 812, the IR code optimizer 313 replaces the destination of node 1 with the destination of the demote node. Referring to Code Segment 8, the IR code optimizer 313 replaces the node 1 at line 16 with the node 1 shown in Code Segment 8.2. Note that the IR code optimizer 313 has replaced the two variable multiply operation of line 16 (in Code Segment 8) with the three variable multiply operation in Code Segment 8.2.

| | |
|---|---|
| 15.1 | CM_s_move_2L(NT0, CMC_p_temp_0, 16, 32); |
| 15.2 | CM_s_move_2L(NT1, CMC_p_temp_1, 16, 32); |

Copyright, Thinking Machines Corporation, 1991
Code Segment 8.1

| | |
|---|---|
| 16 | CM_s_multiply_3_3L(result, CMC_p_temp_0, CMC_p_temp_1, 16, 32, 32); |

Copyright, Thinking Machines Corporation, 1991
Code Segment 8,1

In step 804, the IR code optimizer 313 determines whether the operation of node 1 may be performed at a lower precision. Generally, mathematical and logical operations wherein the high order bits do not affect the result of the lower order bits may be performed at lower precisions. Such mathematical and logical operations which may be performed at lower precision include addition, subtraction, logical OR, logical AND, exclusive OR, and multiplication. Examples of mathematical and logical operations which may not be performed at a lower precision include division, shift right, and square root. Referring to Code Segment 8, the operation of node i is a multiply. As noted above, multiplies may be performed at lower precision. Therefore, the IR code optimizer 313 executes step 808.

Note that if the IR code optimizer 313 determined that the operation of node 1 could not be performed at a lower precision, then the IR code optimizer 313 would not be able to perform demotion optimization. Therefore, the IR code optimizer 313 would return.

In step 808, the IR code optimizer 313 generates, for each source of node 1, a temporary parallel variable having the same shape and type of the destination of the demote node.

In step 814, the IR code optimizer 313 replaces each source of node 1 with its associated temporary parallel variable. Referring to Code Segment 8, the IR code optimizer 313 produces the node 1 as shown in Code Segment 8.3. Note that, in Code Segment 8.3, the variables result, NT0, and NT1 are all short integers. Also note that the node 1 in Code Segment 8.3 is similar to the multiply shown in line 12 of Code Segment 7.

In step 815, the IR code optimizer 313 removes the demote node.

Following the completion of step 815, the IR code optimizer 313 has replaced mathematical operations, from the unoptimized IR code, which use temporary parallel values of large sizes, with equivalent mathematical operations, in the optimized IR code, which use temporary parallel variables having smaller sizes. In the remaining steps of the flow chart shown in FIGS. 8A and 8B, the IR code optimizer 313 attempts to delete demotions (and corresponding promotions) which were required to construct the optimized mathematical operation (using temporary parallel variables of smaller sizes).

In step 818, the IR code optimizer 313 selects one of the nodes in the IR tree. The IR code optimizer 313 starts at the top node and progresses forward.

In step 820, the IR code optimizer 313 determines whether the selected node is a promote node. If the selected node is not a promote node, then the IR code optimizer 313 determines whether there are any other nodes to process (in step 822). If there are more nodes to process, the IR code optimizer 313 selects another node for processing by moving to step 818.

If, in step 820, the IR code optimizer 313 determined that the selected node was a promote node, then the IR code optimizer 313 executes step 824. Referring to Code Segment 8, assume that in step 818 the IR code optimizer 313 selected the node at line 12. The node at line 12 is a promote node wherein a short integer (variable a) is promoted to an integer (temporary parallel variable 0). In processing step 820, the IR code optimizer 313 would move to step 824.

In step 824, the IR code optimizer 313 scans forward from the promote node for a demote node having a source equal to the destination of the promote node. Referring to Code Segment 8, the destination of the promote node (in line 12) is temporary parallel variable 0.

The node at line 15.1 (in Code Segment 8.1) is a demote node having a source equal to temporary parallel variable 0. Therefore, the node at line 15.1 is a demote node having a source (temporary parallel variable 0) equal to the destination (temporary parallel variable 0) of the promote node. Therefore, while processing step 824, the IR code optimizer 313 would select the node at line 15.1 (in Code Segment 8.1).

In step 826, the IR code optimizer 313 would determine whether a demote node as specified in step 824 was found. If such a demote node was not found, then demote nodes could not be eliminated and the IR code optimizer 313 returns. If, however, the IR code optimizer 313 found a demote node in step 824, the IR code optimizer 313 would process step 828.

In step 828, the IR code optimizer 313 determines whether the type of the source of the promote node equals the type of the destination of the demote node. If the types are not equal, then the IR code optimizer 313 cannot eliminate demote nodes. Therefore, the IR code optimizer 313 returns. However, if the IR code optimizer 313 determines that the types are equal, then the IR code optimizer 313 processes step 830.

Referring to Code Segment 8, the source of the promote node is variable a having a type of short integer. The destination of the demote node is temporary parallel variable NT0 having a type of short integer. Therefore, the IR code optimizer 313 would find that step 828 was satisfied and therefore process step 830.

In step 830, the IR code optimizer 313 removes the promote node. Referring to Code Segment 8, in processing step 830, the IR code optimizer 313 would remove the promote node at line 12.

In step 832, the IR code optimizer 313 replaces the demote node with an assignment wherein the destination of the demote node is set equal to the source of the promote node. Referring to Code Segment 8.1, the IR code optimizer 313 in step 832 would replace the node at line 15.1 with the node shown in Code Segment 8.4, below.

| | |
|---|---|
| 16 | CM_s_multiply_3_1L (result, NT0, NT1, 16); |

Copyright, Thinking Machines Corporation, 1991
Code Segment 8.3

| | |
|---|---|
| 15.1 | CM_s_move_1L(NT0, a, 16); |

Copyright, Thinking Machines Corporation, 1991
Cose Segment 8,4

In step 834, the IR code optimizer 313 copy propagates the source of the assignment (created in step 832) to remove this assignment. Copy propagation is well known to those skilled in the art. Consider Code Segment 8.4. The assignment of a to NT0 essentially means that a may be used whenever NT0 is used. Therefore, during step 834, the IR code optimizer 313 scans through the IR tree and replaces all occurrences of NT0 with the variable a. Since a is used everywhere instead of NT0, NT0 is superfluous. Therefore, during step 834, the IR code optimizer 3 13 removes .the assignment of a to NT0 at line 15.1 (in Code Segment 8.4). This is illustrated in Code Segment 7 at line 11 wherein a is used in the add operation rather than a temporary parallel variable.

After executing step 834, the IR code optimizer 313 has completed its demotion optimization of the demoted node found in step 512. Note that step 518 will be performed for the demote node in line 15.2 of Code Segment 8.1. After line 518 has been performed for all of the demote nodes in the Code Segment 8 (including the additions to the Code Segment 8 shown in Code Segments 8.1 and 8.3), the optimized IR code shown in Code Segment 7 will be achieved.

7. Step 522: Eliminate Unnecessary Temporary Parallel Variables

As noted above, during step 522 the IR code optimizer 313 eliminates unnecessary temporary parallel variables. Unnecessary temporary parallel variables and the elimination of such unnecessary temporary parallel variables are illustrated in the C* instruction shown in Code Segment 9, 10, and 11. Code Segment 9 represents the source code 308. Code Segment 11 represents the unoptimized IR code 332 of the source code 308 shown in Code Segment 9. Code Segment 10 represents the optimized IR code 399 of the unoptimized IR code 332 shown in Code Segment 11.

```
1   void fraction (a, b, c)
2   double:current a, b, c;
3   {
4   double:current m;
5
6   m = a*a/b = b*b/c;
7   }
```

Copyright, Thinking Machines Corporation, 1991
Code Segment 9

```
1   void fraction (a, b, c)
2       CMC_d a;
3       CMC_d b;
4       CMC_d c;
5   {
6   CMC_Shape_t CMC_entry_shape = ((CMC_call_start_trap && CMC_start_trap()),
7   CM_current_vp_set);
8   CMC_d CMC_p_temp_0 = CM_allocate_stack_field_vp_set(128, CM_current_vp_set);
9   CMC_d CMC_p_temp_2 = CM_add_offset_to_field_id(CMC_p_temp_0, 64);
10  CMC_d m = CM_allocate_stack_field_vp_set(64, CM_current_vp_set);
11  CM_f_multiply_always_3_1L(CMC_p_temp_0, a, a, 52, 11);
12  CM_f_divide_always_3_1L(CMC_p_temp_0, b, 52, 11);
13  CM_f_multiply_always_3_1L(CMC_p_temp_2, b, b, 52, 11);
14  CM_f_divide_always_2_1L(CMC_p_temp_2, c, 52, 11);
15  CM_f_add_3_1L(m, CMC_p_temp_0, CMC_p_temp_2, 52, 11);
16  CM_deallocate_stack_through(CMC_p_temp_0);
17  }
```

Copyright, Thinking Machines Corporation, 1991
Code Segment 10

```
    void fraction(a, b, c)
2       CMC_d a;
3       CMC_d b;
4       CMC_d c;
5   {
6   CMC_Shape_t_CMC_entry_shape = ((CMC_call_start_trap && CMC_start_trap()),
7   CM_current_vp_set);
8   CMC_d CMC_p_temp_0 = CM_allocate_stack_field_vp_set(256, CM_current_vp_set);
9   CMC_d CMC_p_temp_1 = CM_add_offset_to_field_id(CMC_p_temp_0, 64);
10  CMC_d CMC_p_temp_2 = CM_add_offset_to_field_id(CMC_p_temp_1, 64);
11  CMC_d CMC_p_temp_3 = CM_add_offset_to_field_id(CMC_p_temp_2, 64);
12  CMC_d m = CM_allocatte_stack_field_vp_set(64, CM_current_vp_set);
13  CM_f_multiply_always_3_1L(CMC_p_temp_0, a, a, 52, 11);
14  CM_f_divide_always_3_1L(CMC_p_temp_1, CMC_p_temp_0, b, 52, 11);
15  CM_f_multiply_always_3_1L(CMC_p_temp_2, b, b, 52, 11);
16  CM_f_divide_always_3_1L(CMC_p_temp_3, CMC_p_temp_2, c, 52, 11);
17  CM_f_add_3_1L(m, CMC_p_temp_1, CMC_p_temp_3, 52, 11);
18  CM_deallocate_stack_through(CMC_p_temp_0);
19  }
```

Copyright, Thinking Machines Corporation, 1991
Code Segment 11

Note that the unoptimized IR code 399 shown in Code Segment includes four temporary parallel variables. The optimized IR code 399 shown in Code Segment 10 uses two temporary parallel variables. The manner in which the IR code optimizer 313 executes step 522 to eliminate unnecessary temporary parallel variables will now be described in greater detail. FIGS. 9A and 9B collectively illustrate the operation of the IR code optimizer 313 during step 522.

In step 902, the IR code optimizer 313 conducts a live variable analysis to generate conflict sets of the temporary parallels in the unoptimized IR code 332. The conflict sets contain live variables. In this context, live variables refer to temporary parallel variables which are simultaneously needed for processing some instruction. Therefore, the temporary parallel variables in a conflict set are said to conflict since one of the temporary parallel variables cannot be used in place of another temporary parallel variable since both are required to process a future instruction. Live variables, conflict sets, and methods for generating conflict sets are well-known to those skilled in the art.

For example, referring to the unoptimized IR code 332 in Code Segment 11, the temporary parallel variable 0 and temporary parallel variable 1 do not conflict. Also, the temporary parallel variable 2 and temporary parallel variable 3 do not conflict. Therefore, the temporary parallel variable 0 and the temporary parallel variable 1 would not be in the same conflict set. Also, the temporary parallel variable 2 and the temporary parallel variable 3 would not be in the same conflict set.

In step 904, the IR code optimizer 313 selects one of the temporary parallel variables in the unoptimized IR code 332 for processing.

In step 906, the IR code optimizer 313 determines whether any equivalence classes exist. An equivalence class is essentially the opposite of a conflict set. An equivalence class contains temporary parallel variables which do not conflict. Additionally, the temporary parallel variables in an equivalence class have the same data type and the same shape.

According to the present invention, each of the equivalence classes has a class representative. The class representative is one of the temporary variables in the equivalence class. All of the other temporary variables in the equivalence class map to the class representative. In other words, the class representative in an equivalence class replaces all of the other temporary parallel variables in the equivalence class. In this manner, the number of temporary parallel variables is minimized.

If the IR code optimizer 313 determines in step 906 that more equivalence classes exist, then the IR code optimizer 313 processes step 908. In processing step 908, and subsequent steps 910, 912, and 914, the IR code optimizer 313 attempts to assign the selected temporary parallel variable to an equivalence class. Therefore, in step 908, the IR code optimizer 313 selects one of the equivalence classes.

In step 910, the IR code optimizer 313 determines whether the selected temporary parallel variable conflicts with the class representative of the selected equivalence class. If they conflict, then the selected temporary parallel variable cannot be added to the current equivalence class. Therefore, the IR code optimizer 313 loops back to step 906 to process the next equivalence class.

If, however, in step 910, the IR code optimizer 313 determines that the selected temporary parallel variable does not conflict with the class representative of the selected equivalence class (selected in step 908), then the IR code optimizer 313 processes step 912. In step 912, the IR code optimizer 313 determines whether the selected temporary parallel variable has a shape and data type which is equivalent to the class representative of the selected equivalent class.

The manner in which the IR code optimizer 313 determines the shape equivalence/nonequivalence of two parallel variables is illustrated in FIG. 6. Note that the flowchart in FIG. 6 is written in terms of determining whether the shape of a parallel variable A is equivalent to the shape of a parallel variable B. In the context of implementing step 912 of FIG. 9A, assume that parallel variable A represents the selected temporary parallel variable and that parallel variable B represents the class representative of the selected equivalence class.

In step 602, the IR code optimizer 313 determines whether the shape of variable A is equal to the shape of variable B. As discussed above, two parallel variables can only have equal shapes if the parallel variables were declared using the identical shape. This is illustrated in the C* instructions shown in Example 6. As illustrated in Example 6, variable1 and variable2 are declared using shapeC (see line 8). Therefore, the shape of variable1 and the shape of variable2 are equal.

| 1 | shape [100] shape C; |
|---|---|
| 2 | shape [ ] shpae D; |
| 3 | shape [10] shape E; |
| 4 | |
| 5 | shape D = shape E; |
| 6 | |
| 7 | { |
| 8 | int: shape C variable 1, variable 2; |
| 9 | int: shape D variable 3; |
| 10 | int: shape E variable 4; |
| 11 | } |

Copyright, Thinking Machines Corporation, 1991
Example 6

If, in step 602, the shape of the variable A is not equal to the shape of the variable B, then the IR code optimizer 313 executes step 604. In step 604, the IR code optimizer 313 determines whether the shape of the variable A and the shape of the variable B are equivalent. As noted above, the shapes of two parallel variables are equivalent if the shape of one of the parallel variables has been assigned to the shape of the other parallel variable via a shape assignment node. For example, in Example 6, the shape of variable3 is equivalent to the shape of variable4 because shaped and shapeE have been assigned to one another in the shape assignment instruction in line 5.

According to the preferred embodiment of the present invention, the IR code optimizer 313 performs step 604 by using the list of equivalents which the IR code optimizer 313 generated in steps 504, 506, 508, 526, and 528. Specifically, the IR code optimizer 313 accesses the list of equivalents and determines whether the shape of the variable A is listed as an equivalent to the shape of the variable B (alternatively, the IR code optimizer 313 could access the list of equivalents and determine whether the shape of the variable B is listed as an equivalent of the shape of the variable A).

If the IR code optimizer 313 determines that the shape of the variable A is either equal to (from step 602) or equivalent to (from step 604) the shape of the variable B, then the IR code optimizer 313 executes step 608. Otherwise, the IR code optimizer 313 executes step 606.

In step 608, the IR code optimizer 313 indicates that the shape of the variable A is equivalent to the shape of the variable B. (Note that if two shapes are equal, then they are also equivalent.)

In step 606, the IR code optimizer 313 indicates that the shape of the variable A is not equivalent to the shape of the variable B. (Note that if two shapes are not equivalent, then the two shapes cannot be equal.)

Referring again to FIG. 9A, if the IR code optimizer 313 determines in step 912 that the selected temporary variable and the class representative of the selected equivalence class do not have equivalent shape and data type, then the selected temporary parallel variable cannot be added to the selected equivalence class. Therefore, the IR code optimizer 313 loops back to step 906 to process the next equivalence class.

However, if the selected temporary parallel variable has an equivalent shape and data type as the class representative of the selected equivalence class, the IR code optimizer 313 processes step 914. In step 914, the IR code optimizer 313 adds the selected temporary parallel variable to the selected equivalence class.

In steps 917, 930, 932, and 934, the IR code optimizer 313 determines whether the selected temporary parallel variable, which has just been added to the selected equivalence class, should be assigned as the class representative of the selected equivalence class.

Therefore, in step 917, the IR code optimizer 313 determines whether the selected temporary parallel variable and class representative of the selected equivalence class have the same scope in the unoptimized IR code 332. The meaning and implication of scope, with regard to computer programs, are well-known to those skilled in the art.

If, in step 917, the IR code optimizer 313 determines that they have the same scope, then the IR code optimizer 313 executes step 932. Otherwise, the IR code optimizer 313 executes step 930.

In step 932, the IR code optimizer 313 determines whether the temporary parallel variable was declared before the class representative. If the selected temporary parallel variable was declared before the class representative, then the IR code optimizer 313 sets the class representative equal to the selected temporary parallel variable. This is done in step 934.

If, in step 932, the IR code optimizer 313 finds that the selected temporary parallel variable was declared after the class representative, then the IR code optimizer 313 does not change the class representative. Rather, the IR code optimizer 313 loops to step 926 to process the next temporary parallel variable.

In step 930, the IR code optimizer 313 determines whether the selected temporary parallel variable is at a higher scope than the class representative. If the selected temporary parallel variable is at a higher scope, then the IR code optimizer 313 sets the class representative equal to the selected temporary parallel variable. This is done in step 934. Otherwise, the IR code optimizer 313 loops to step 926 in order to process the next temporary parallel variable.

Consider once again step 906. If, in processing step 906, the IR code optimizer 313 determines that more equivalence classes do not exist, then the IR code optimizer 313 executes steps 918, 920, 922, and 926 in order to create a new equivalence class. Specifically, in step 918 the IR code optimizer 313 creates a new equivalence class.

In step 920, the IR code optimizer 313 assigns the selected temporary parallel variable to the new equivalence class.

In step 922, the IR code optimizer 313 sets the class representative of the new equivalence class equal to the selected temporary parallel variable.

In step 926, the IR code optimizer 313 determines whether there are more temporary parallel variables in the unoptimized IR code 332 to process. If more temporary parallel variables exist, then the IR code optimizer 313 loops back to 904 to process the next temporary parallel variable. Otherwise, the IR code optimizer 313 returns.

The operation of the IR code optimizer 313 during step 522 is further described below with reference to Code Segments 9, 10, and 11.

Specifically, if the IR code optimizer 313 processed the unoptimized IR code 332 of Code Segment 11 according to the flow chart shown in FIGS. 9A and 9B, then the IR code optimizer 313 would create two equivalence classes according to steps 918, 920, and 922. The first equivalence class would have temporary parallel variable 0 and temporary parallel variable 1. The second equivalence class would contain temporary parallel variable 2 and temporary parallel variable 3. The IR code optimizer 313 would build the equivalence classes by performing steps 906, 908, 910, 912, and 914. Note that temporary parallel variable 0, temporary parallel variable 1, temporary parallel variable 2, and temporary parallel variable 3 all have equivalent shape and data type. Therefore, the membership in the first and second equivalence classes is based entirely on conflict among the temporary parallel variables (as determined in step 910). Such conflict between the four temporary parallel variables of Code Segment 11 is described above.

The class representative of the first equivalence class is temporary parallel variable 0. The class representative of the second equivalence class is temporary parallel variable 2. Note that the four temporary parallel variables in the Code Segment 1 all have the same scope. Therefore, class representative selection in the first and second equivalence classes is determined entirely on order of declaration (as determined in step 932).

Note that temporary parallel variable 0 is declared before temporary parallel variable 1. Also note that temporary parallel variable 2 is declared before temporary parallel variable 3. Therefore, temporary parallel variable 0 and temporary parallel variable 2 are the class representatives in their respective equivalence classes.

Since temporary parallel variable 0 is the class representative in the first equivalence class, the temporary parallel variable 1 maps to temporary parallel variable 0. This is illustrated in the optimized IR code 399 of Code Segment 10 where all references to temporary parallel variable 1 are replaced by references to temporary parallel variable 0.

Since temporary parallel variable 2 is the class representative in the second equivalence class, the temporary parallel variable 3 maps to the temporary parallel variable 2. This is illustrated in the optimized IR code 399 of Code Segment 10 wherein all references to the temporary parallel variable 3 are replaced by references to the temporary parallel variable 2.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for optimizing an intermediate representation (IR) of a source program to generate a target program, the target program to be executed in a data parallel computer, the source program written using a data parallel computer programming language supporting parallel variables having different precision, the system comprising:

promotion operation locating means for determining whether the intermediate representation includes a promotion operation associated with a source parallel variable of a first precision and a destination parallel variable of a second precision, said second precision being greater than said first precision, said promotion operation, when executed in the data parallel computer, enabling the data parallel computer to promote the source parallel variable to said destination parallel variable;

demotion operation locating means, responsive to said promotion operation locating means determining that said intermediate representation includes a promotion operation, for determining whether the intermediate representation includes a demotion operation to be executed by the data parallel computer after the data parallel computer executes the promotion operation;

determining means, responsive to a positive determination by the demotion operation locating means, for determining whether the destination parallel variable of the demotion operation is of a data type which is equal to a data type of said source parallel variable of the promotion operation; and intermediate representation modifying means responsive to a positive determination by said determining means, for inserting into the intermediate representation an instruction which, when executed by the data parallel computer, enables the data parallel computer to assign said destination parallel variable of the demotion operation a data type corresponding to that of the source parallel variable of the promotion operation.

2. A system as defined in claim 1 wherein the intermediate representation modifying means further comprises means for deleting the promotion operation from the intermediate representation in response to a positive determination by said demotion operation locating means.

3. A system as defined in claim 1 further comprising means for copy propagating the assignment of said destination parallel variable of the demotion operation to the source parallel variable of the promotion operation.

4. A computer-implemented method for optimizing an intermediate representation (IR) of a source program to generate a target program, the target program to be executed in a data parallel computer, the source program written using a data parallel computer programming language supporting parallel variables having different precision, the method comprising the steps of:

determining whether the intermediate representation includes a promotion operation associated with a source parallel variable of a first precision and a destination parallel variable of a second precision, said second precision being greater than said first precision, said promotion operation, when executed in the data parallel computer, enabling the data parallel computer to promote the source parallel variable to said destination parallel variable;

in response to determining that the intermediate representation includes a promotion operation, determining whether the intermediate representation includes a demotion operation to be executed by the data parallel computer after the data parallel computer executes the promotion operation;

in response to determining that the intermediate representation includes a demotion operation to be executed by the data parallel computer after the data parallel computer executes the promotion operation, determining whether the destination parallel variable of the demotion operation is of a data type which is equal to a data type of said source parallel variable of the promotion operation; and in responsive to a determination that the destination parallel variable of the demotion operation is of a data type which is equal to a data type of said source parallel variable of the promotion operation, inserting into the intermediate representation an instruction which, when executed by the data parallel computer, enables the data parallel computer to assign said destination parallel variable of the demotion operation a data type corresponding to that of the source parallel variable of the promotion operation.

5. A method as defined in claim 4 wherein the intermediate representation modification step includes the step of deleting the promotion operation from the intermediate representation in response to a determination that the intermediate representation includes a demotion operation to be executed by the data parallel computer alter the data parallel computer executes the promotion operation.

6. A method as defined in claim 4 further comprising the step of copy propagating the assignment of said destination parallel variable of the demotion operation to the source parallel variable of the promotion operation.

* * * * *